(12) United States Patent
Togawa

(10) Patent No.: US 6,240,530 B1
(45) Date of Patent: May 29, 2001

(54) VIRUS EXTERMINATION METHOD, INFORMATION PROCESSING APPARATUS AND COMPUTER-READABLE RECORDING MEDIUM WITH VIRUS EXTERMINATION PROGRAM RECORDED THEREON

(75) Inventor: Yoshifusa Togawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/013,517

(22) Filed: Jan. 26, 1998

(30) Foreign Application Priority Data

Sep. 5, 1997 (JP) ................................... 9-241258

(51) Int. Cl.⁷ ..................................................... G06F 11/00
(52) U.S. Cl. .................................. 714/38; 713/200; 713/1
(58) Field of Search ............................. 714/1, 38; 713/1, 713/2, 200

(56) References Cited

U.S. PATENT DOCUMENTS

| | | | |
|---|---|---|---|
| 5,511,184 | * 4/1996 | Lin | 710/261 |
| 5,802,277 | * 9/1998 | Cowlard | 713/200 |
| 6,026,502 | * 2/2000 | Wakayama | 713/200 |

FOREIGN PATENT DOCUMENTS

| | | | |
|---|---|---|---|
| 0510244A1 | * 10/1992 | (EP) | G06F/1/00 |
| 6-274419 | 9/1994 | (JP). | |
| 7-295804 | 11/1995 | (JP). | |

OTHER PUBLICATIONS

Symantec Corporation, "Norton AntiVirus for Windows 95 User's Guide", Chpts 2, 7, App B, 1995.*
John McAfee and Colin Haynes, "Computer Viruses, Worms Data Diddlers, Killer Programs, and Other Threats to Your System", Chapter 10, 1989.*

* cited by examiner

Primary Examiner—Norman M. Wright
Assistant Examiner—Christopher Revak
(74) Attorney, Agent, or Firm—Staas & Halsey LLP

(57) ABSTRACT

The invention provides a virus extermination method by which an error in operation by a user is prevented and optimum virus extermination based on a type of a virus can be performed without imposing much burden in operation. The virus extermination method includes the virus detection and identification step of detecting a computer virus as a software destroying factor which infects a computer system and identifying a type of the computer virus, the memory clearing step of receiving trigger information which is based on detection of the infecting computer virus and clearing information stored in all of those areas of a memory which are write-enabled in an ordinary operation of the computer system, the operating system fetching and starting up step of fetching an operating system, in which no virus is resident, from the outside and starting up the operating system after the stored information of the memory is cleared, and the virus extermination step of exterminating the computer virus under operation environment of the operating system.

32 Claims, 17 Drawing Sheets

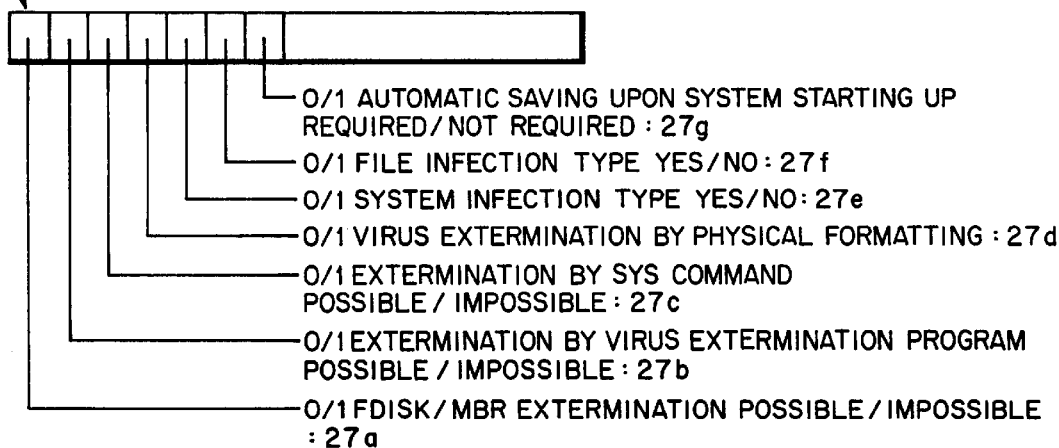

FIG. 7(a)

12-7: VIRUS EXTERMINATION PRIORITY INFORMATION MANAGEMENT TABLE

| VIRUS NAME | EXTERMINATION FLAG | PRIORITY EXTERMINATION INFORMATION | EXTERMINATION INFORMATION | VIRUS EXTERMINATION PROGRAM INFORMATION |
|---|---|---|---|---|
| 26 | 27 | 28 | 29 | 30 |

FIG. 7(b)

27: EXTERMINATION FLAG

- 0/1 AUTOMATIC SAVING UPON SYSTEM STARTING UP REQUIRED/NOT REQUIRED : 27g
- 0/1 FILE INFECTION TYPE YES/NO : 27f
- 0/1 SYSTEM INFECTION TYPE YES/NO : 27e
- 0/1 VIRUS EXTERMINATION BY PHYSICAL FORMATTING : 27d
- 0/1 EXTERMINATION BY SYS COMMAND POSSIBLE / IMPOSSIBLE : 27c
- 0/1 EXTERMINATION BY VIRUS EXTERMINATION PROGRAM POSSIBLE / IMPOSSIBLE : 27b
- 0/1 FDISK/MBR EXTERMINATION POSSIBLE/IMPOSSIBLE : 27a

FIG. 7(c)

PRIORITY EXTERMINATION INFORMATION 28

| NUMBER | EXTERMINATION TYPE | EXTERMINATION TYPE | |
|---|---|---|---|
| 28a | 28b | 28b | |

NUMBER : NUMBER OF EXTERMINATION METHODS
EXTERMINATION TYPE :
    PHYSICAL FORMATTING + FILE COPYING PROCESSING (0001)
    USE OF VIRUS EXTERMINATION PROGRAM (0002)
    EXTERMINATION BY SYS COMMAND (0004)
    EXTERMINATION BY FDISK/MBR (0008)
    DELETION OF FILE (0010)

FIG. 8

30: VIRUS EXTERMINATION PROGRAM INFORMATION

| VIRUS EXTERMINATION PROGRAM NUMBER 30a | | |
|---|---|---|
| PRIORITY DEGREE 30b | EXTERMINATION MEANS POINTER 30c | EXTERMINATION METHOD TEXT POINTER 30d |
| | | |
| ~ | ~ | ~ |
| | | |

FIG. 9

12-8: EXTERMINATION MEANS TABLE

| REGISTRATION PROGRAM NUMBER OF EXTERMINATION MEANS 31a | |
|---|---|
| EXTERMINATION MEANS NAME 31b | EXTERMINATION MEANS POINTER 31c |
| | |
| ~ | ~ |
| | |

VIRUS EXTERMINATION METHOD, INFORMATION PROCESSING APPARATUS AND COMPUTER-READABLE RECORDING MEDIUM WITH VIRUS EXTERMINATION PROGRAM RECORDED THEREON

BACKGROUND OF THE INVENTION

This invention relates to a virus extermination method, an information processing apparatus and a computer-readable recording medium with a virus extermination program recorded thereon suitable for use to effect virus extermination when a computer is infected with a computer virus particularly with a computer virus of the type (system infection type) which infects and is resident in a system or of the memory infection type.

A computer virus of the system infection type causes a destructive program (virus) to be resident in a system area (boot area or IPL (Initial Program Loading) area) of a computer and effects destruction and infection to another system area. Computer viruses of the system infection type occupy a ratio of approximately 70 to 80% of computer viruses which have been discovered or whose appearance has been confirmed till now.

Computer viruses of the system infection type described above in almost all cases have a memory resident character. A virus of the memory resident type does not directly cause information from an infected medium to another medium, but becomes resident once in a main memory (hereinafter referred to simply as memory) of a computer started using an infected medium, monitors commands of a BIOS (Basic I/O System) or a DOS (Disk Operating system) from within the memory in which the virus is resident and infects, at a point of time when another file is accessed, the accessed file.

Further, in computers in recent years including notebook type personal computers, since a module which constructs an OS or application software has a large capacity, a resume function is used so that, even if the power supply is disconnected, information in the memory is maintained without being erased to allow a continued operation to be performed immediately even if the power supply is connected again, thereby to reduce the time required for the startup of the computer.

Also a personal computer (so-called green PC) has been developed which is constructed so as to operate, almost similarly to the resume function mentioned above, with an auxiliary power supply such as a battery or with a minimum power supply while the personal computer is not used.

If a computer, a green PC or a like apparatus having the resume function mentioned above is infected with computer viruses of the memory resident type described above, then it sometimes occurs that, even if the power supply is disconnected intending elimination of the viruses, the stored contents of the memory remain as they are and some of the viruses in the memory remain resident, and although it is anticipated that the viruses have been exterminated, actually the viruses have not been exterminated as yet.

Further, as described above, almost all of viruses of the system infection type and the memory resident type are of the type which infects a medium of a destination of an access at a point of time when a storage apparatus is accessed.

Therefore, when a computer is rendered operative by executing a program stored in a storage apparatus such as a hard disk under environment wherein the system area of the storage apparatus is infected with a virus, if another auxiliary storage apparatus (floppy disk drive or the like) is accessed during execution of the program, then the access acts as a trigger to infection to a medium (for example, a floppy disk) of the auxiliary storage apparatus of the destination of the access.

More particularly, if a virus is present in the memory, the virus handles an interruption or the like using a file access of a BIOS as a trigger so that the system area of an auxiliary storage apparatus as a medium of the destination of the access is infected by the virus.

In other words, in order to access a medium such as an auxiliary storage apparatus, execution of a program in the system area must be involved, and if the system area is infected with a virus, then also the system area of a medium of the destination of the access becomes infected with the virus.

In order to exterminate such a virus as described above, various virus check programs have been developed for different types of viruses. However, although ordinary virus check programs can detect that the memory is infected with a virus, they cannot exterminate the virus, but merely notify whether or not a virus has been detected after a search of the system area. Accordingly, in order to exterminate a virus resident in the memory, there is no countermeasure other than to clear the memory.

Furthermore, even if an extermination program is executed when a virus is resident in the memory, since the virus re-infects a file through a BIOS when the file is accessed, infection still occurs even after the extermination.

In particular, if a program for checking a virus is read in from, for example, a floppy disk and is operated, then a virus which is resident in a disk apparatus or the like can be removed. However, since a virus remains in the memory, the virus re-infects a file (program data for checking a virus stored on the floppy disk) through a BIOS when the file is accessed.

In short, even if a program is operated in order to exterminate a virus in a disk, after extermination of the virus in the disk, the disk is infected with a virus again from a virus in the memory which remains without being exterminated.

In other words, it sometimes occurs that, when to read out a virus check program from a floppy disk in order to detect a virus of the system infection type, an erroneous operation is performed to start up a boot of an infected medium.

In this instance, a system is started from the floppy disk whose boot area is infected with a virus. Therefore, if the virus check program is started, then the virus infects the memory and is thereafter resident in the memory.

Therefore, in order to exterminate a virus which infects the system area in a storage apparatus such as a hard disk in a personal computer or the like of the pre-install type wherein, for example, software for starting a computer is built in the hard disk in advance, a virus extermination program must be executed after the computer is started up, after the memory is cleared, from an external medium in which a system program (boot or IPL) and an operating system (OS) which are not infected with a virus are stored.

In particular, if a personal computer or the like which is of the pre-install type or has a resume function is infected with a computer virus of the system infection type, the computer virus of the system infection type is exterminated, for example, by a procedure which includes the following steps ① to ④.

① All power supplies are disconnected and also an auxiliary power supply and so forth for realizing a resume function are physically removed to cut electric energy supplied to the memory to remove a virus from the memory.

② The computer is started up with an operating system (for example, a DOS) which is stored on a floppy disk or the like and constructed at least from the minimum program necessary for the startup.

③ A virus extermination program is executed under operation environment of the started up operating system to remove a virus which is resident in a storage apparatus or the like whose data are not erased even if the power supply to it is cut, thereby to restore the original environment wherein the computer is not infected with a virus.

As an alternative, necessary data stored on the storage apparatus are saved or copied one by one onto an external storage apparatus such as a floppy disk, and then, physical formatting (operation to delete all stored contents of a hard disk) is performed to place the disk into a state wherein the disk allows operation of an operating system which is not infected with a virus.

Thereafter, an operating system which is not infected with a virus is installed again as system startup software from the outside, and the necessary data which have been saved or copied onto the floppy disk or the like as described above are copied back to restore the original environment wherein the computer is not infected with a virus.

④ It is confirmed again whether extermination of a virus has been performed successfully, and the extermination operation is ended when the success of extermination is conformed.

However, where such a virus extermination procedure as described above is used to perform virus extermination, there is a subject in that a user may possibly operate in error or may be subject to a heavy operation burden because the user itself must perform operations for virus extermination in accordance with the procedure.

Particularly in a personal computer or the like of the pre-install type, a medium such as a floppy disk or a CD-ROM on which a system which is not infected with a virus is stored, a driver for the medium and so forth must be prepared separately. However, some models of personal computers or the like of the type mentioned do not include such a medium as just mentioned in a commodity package, and such a burden as to newly purchase an OS which is not infected with a virus is imposed on users of the models.

Further, also the number of types of viruses exhibits an increase in recent years, and also the number of patterns for extermination increases every time the number of types of viruses increases. As the number of types of viruses increases, also virus extermination programs developed for them become heavier programs which require larger storage capacities, and consequently, a sufficient area to build in a system and such software for virus termination as just described cannot be assured on a floppy disk.

Furthermore, some virus cannot be exterminated by any existing virus check program, and if infection with a virus of the type just mentioned occurs, then physical formatting of a storage apparatus such as a disk apparatus is required. Therefore, the user must usually create backup copies of data stored in the storage apparatus and so forth. In this manner, much time is required for operation for prevention of virus infection.

SUMMARY OF THE INVENTION

It is an object of the present invention to provide a virus extermination method, an information processing apparatus and a computer-readable storage medium with a virus extermination program stored thereon by which an error in operation by a user is prevented and optimum virus extermination based on a type of a virus can be performed without imposing much burden in operation.

In order to attain the object described above, according to an aspect of the present invention, there is provided a virus extermination method, comprising the virus detection and identification step of detecting a computer virus as a software destroying factor which infects a computer system and identifying a type of the computer virus, the memory clearing step of receiving trigger information which is based on detection of the infecting computer virus in the virus detection and identification step and clearing information stored in all of those areas of a memory which are write-enabled in an ordinary operation of the computer system, the operating system fetching and starting up step of fetching an operating system from the outside and starting up the operating system after the stored information of the memory is cleared in the memory clearing step, and the virus extermination step of exterminating the computer virus infecting the computer system under operation environment of the operating system by the operating system fetching and starting up step.

In the virus extermination method, if a virus is detected in the virus detection and identification step, then information stored in the memory is cleared in the memory clearing step, whereafter an operating system is fetched from the outside and started up in the operating system fetching and starting up step and then a virus can be exterminated in the virus extermination step. Consequently, the virus extermination method is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

According to another aspect of the present invention, there is provided a virus extermination method for exterminating a computer virus as a software destroying factor which infects a computer system, comprising the memory clearing step of clearing, in response to trigger information, information stored in all of those areas of a memory which are write-enabled in an ordinary operation of the computer system, the operating system fetching and starting up step of fetching an operating system from the outside and starting up the operating system after the stored information of the memory is cleared in the memory clearing step, the virus detection and identification step of detecting presence of a computer virus which infects the computer system and identifying a type of the computer virus under operation environment of the operating system by the operating system fetching and starting up step, and the virus extermination step of exterminating, when the infecting computer virus is detected in the virus detection and identification step, the computer virus infecting the computer system.

In the virus extermination method, after information of the memory is cleared based on trigger information (the memory clearing step) and an operating system in which no virus is resident is automatically fetched and started up (the operating system fetching and starting up step), the virus check program can be executed to effect an extermination operation based on a type of a virus detected as a result of the execution of the virus check program (virus extermination step). Consequently, the virus extermination method is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

According to a further aspect of the present invention, there is provided an information processing apparatus which includes a memory for storing programs and data for information processing and a processing section for executing the programs to perform various information processing, comprising a virus detection and identification section for detecting a computer virus which infects the information processing apparatus and identifying a type of the detected computer virus, a virus type information registration section for registering information regarding the type of the detected computer virus identified by the virus detection and identification section into a storage area which is access-disabled in an ordinary operation of the information processing apparatus, a trigger information outputting section for outputting trigger information so that the information processing apparatus may enter a processing mode for performing virus extermination, a stored information clearing section operable in response to the trigger information from the trigger information outputting section for clearing information stored in all of those areas of the memory which are access-enabled in an ordinary operation of the information processing apparatus, an operating system fetching and starting up section for fetching an operating system from the outside and starting up the operating system after the stored information is cleared by the stored information clearing section, and a virus extermination section for exterminating, in operation environment of the operating system started up by the operating system fetching and starting up section, the computer virus which infects the memory of the information processing apparatus based on the information regarding the type of the detected virus registered in the virus type information storage section.

In the information processing apparatus, if a virus is detected by the virus detection and identification section, then information stored in the memory is cleared by the stored information clearing section and an operating system is fetched from the outside and started up by the operating system fetching and starting up section, whereafter a virus can be exterminated by the virus extermination section. Consequently, the information processing apparatus is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

In the information processing apparatus, after information of the memory is cleared based on trigger information by the stored information clearing section and an operating system in which no virus is resident is automatically fetched and started up by the operating system fetching and starting up section, the virus check program can be executed by the virus extermination section to effect an extermination operation based on a type of a virus detected as a result of the execution of the virus check program. Consequently, the information processing apparatus is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

According to a still further aspect of the present invention, there is provided a computer-readable recording medium on which a virus extermination program is recorded, wherein the computer-readable recording medium has recorded thereon a virus extermination program which causes a computer to realize a virus detection and identification function of detecting a computer virus as a software destroying factor which infects a computer system and identifying a type of the computer virus, a memory clearing function of receiving trigger information based on detection of the infecting computer virus by the virus detection and identification function and clearing information stored in all of those areas of a memory which are write-enabled in an ordinary operation of the computer system, an operating system fetching land starting up function of fetching an operating system from the outside and starting up the operating system after the stored information of the memory is cleared by the memory clearing function, and a virus extermination function of exterminating the computer virus infecting the computer system under operation environment of the operating system by the operating system fetching and starting up function.

With the computer-readable recording medium, if a virus is detected by the virus detection and identification function, then information stored in the memory is cleared by the stored information clearing function, whereafter an operating system is fetched from the outside and started up by the operating system fetching and starting up function and then a virus can be exterminated by the virus exterminating function. Consequently, the computer-readable recording medium is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

According to a yet further aspect of the present invention, there is provided a computer-readable recording medium on which a virus extermination program for exterminating a computer virus as a software destroying factor which infects a computer system is recorded, characterized in that the virus extermination program recorded on the computer-readable recording medium causes a computer to realize a memory clearing function of clearing, in response to trigger information, information stored in all of those areas of a memory which are write-enabled in an ordinary operation of the computer system, an operating system fetching and starting up function of fetching an operating system from the outside and starting up the operating system after the stored information of the memory is cleared by the memory clearing function, a virus detection and identification function of detecting presence of a computer virus which infects the computer system and identifying a type of the computer virus under operation environment of the operating system by the operating system fetching and starting function, and a virus extermination function of exterminating, when the infecting computer virus is detected by the virus detection and identification function, the computer virus infecting the computer system.

With the computer-readable recording medium, after information of the memory is cleared based on trigger information by the memory clearing function and an operating system in which no virus is resident is automatically fetched and started up by the operating system fetching and starting up function, the virus check program can be executed to effect an extermination operation based on a type of a virus detected as a result of the execution of the virus check program by the virus extermination function. Consequently, the computer-readable recording medium is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 7(a) is a diagrammatic view illustrating a virus extermination priority information management table employed in the information processing apparatus with a virus extermination function of FIG. 3 and FIGS. 7(b) and 7(c) are diagrammatic views illustrating details of part of the virus extermination priority information management table;

FIG. 8 is a diagrammatic view illustrating details of a different part of the virus extermination priority information management table illustrated in FIG. 7(a);

FIG. 9 is a diagrammatic view illustrating an extermination means table employed in the information processing apparatus with a virus extermination function of FIG. 3;

DESCRIPTION OF THE PREFERRED EMBODIMENTS a. Aspects of the Invention

First, different aspects of the present invention are described with reference to the drawings.

Figure 1:
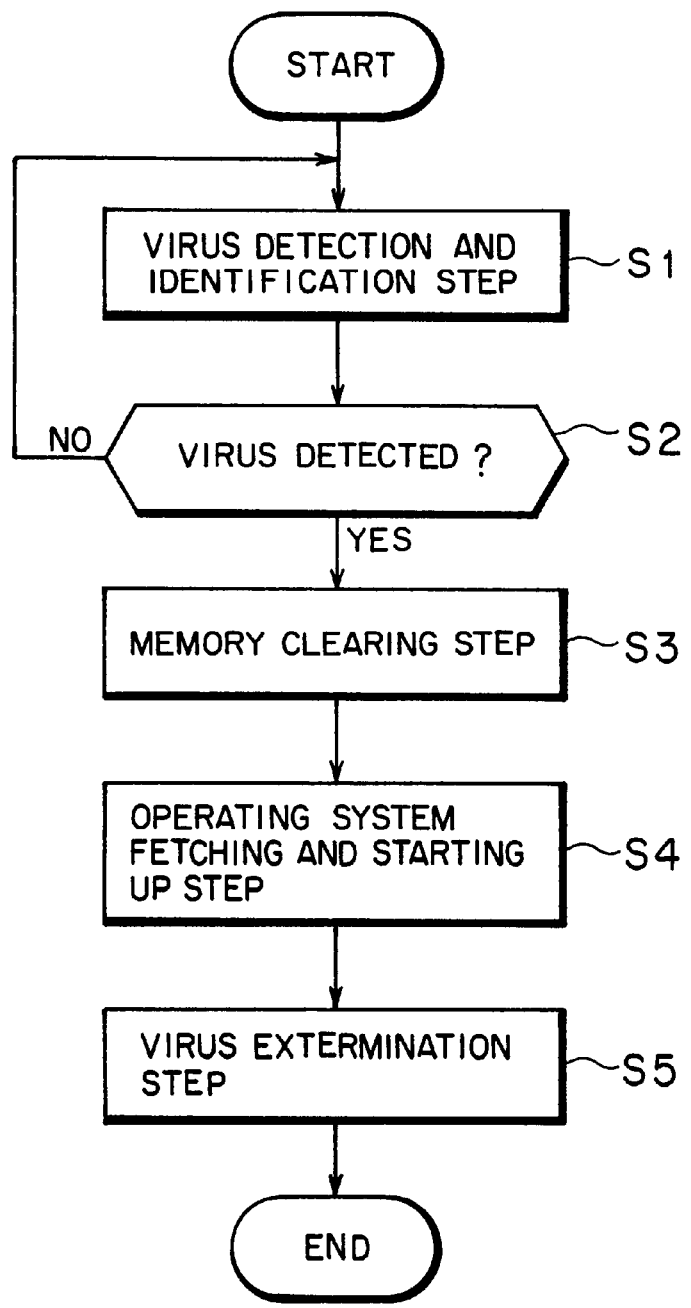
FIGS. 1 and 2 are flow charts illustrating different aspects of the present invention.

FIG. 1 illustrates in flow chart a virus extermination method according to an aspect of the present invention. Referring to FIG. 1. the virus extermination method illustrated includes a virus detection and identification step S1, a memory clearing step S3, an operating system fetching and starting up step S4 and a virus extermination step S5 in order to exterminate a computer virus as a software destroying factor which infects a computer system.

More particularly, in the virus detection and identification step S1, a computer virus as a software destroying factor which infects a computer system is detected and a type of the computer virus is identified. If such an infecting computer virus is detected in the virus detection and identification step S1 (the YES route of step S2), then information stored in all of those areas of a memory which are in a write-enabled state in an ordinary operation of the computer system is cleared in the memory clearing step S3.

After the stored information of the memory is cleared in the memory clearing step S3, an operating system is fetched from the outside and started up in the operating system fetching and starting up step S4.

Then, in the virus extermination step S5, under operation environment of the operating system by the operating system fetching and starting up step S4, a computer virus which infects any other storage apparatus which composes the computer system than the memory is exterminated.

In the virus extermination method, if a virus is detected in the virus detection and identification step S1, then information stored in the memory is cleared in the memory clearing step S3, whereafter an operating system is fetched from the outside and started up in the operating system fetching and starting up step S4 and then a virus can be exterminated in the virus extermination step S5. Consequently, the virus extermination method is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

Figure 2:
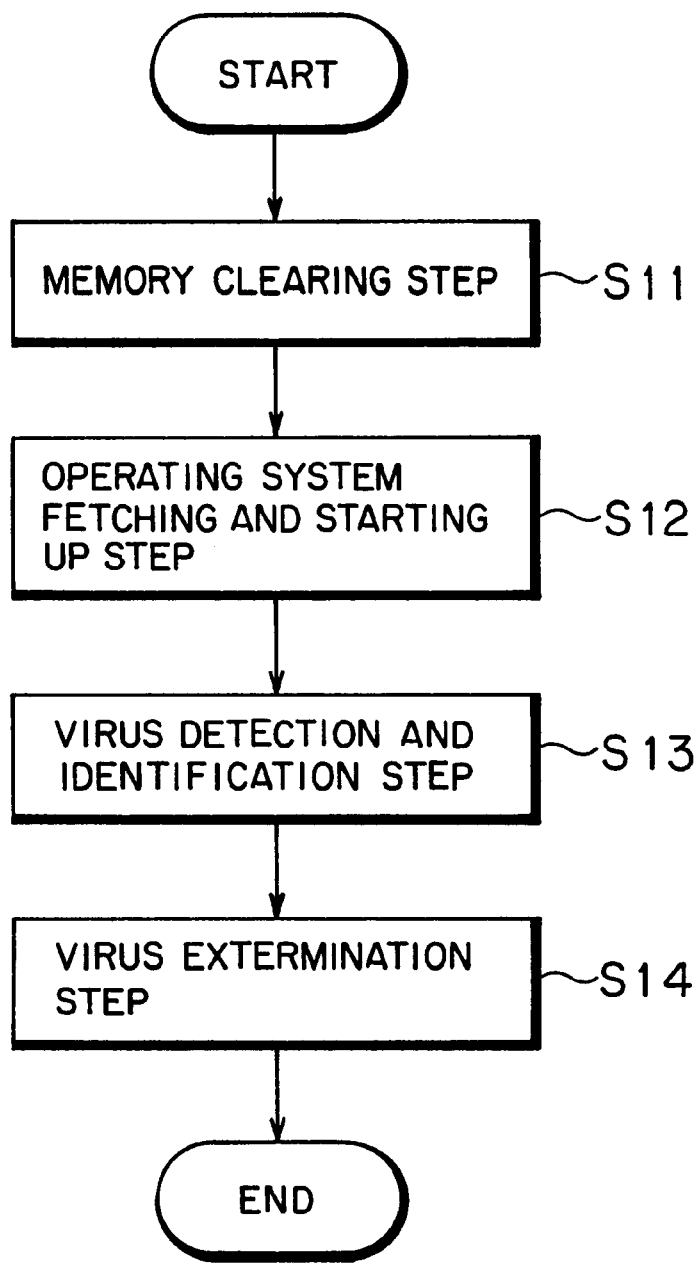

Referring now to FIG. 2, there is illustrated a virus extermination method according to another aspect of the present invention. In the virus extermination method illustrated, in order to exterminate a computer virus as a software destroying factor which infects a computer system, processing by a memory clearing step S11, an operating system fetching and starting up step S12, a virus detection and identification step S13 and a virus extermination step S14 is performed successively.

More particularly, in the memory clearing step S11, information stored in all of those areas of a memory which are in a write enabled state in an ordinary operation of the computer system is cleared. Then, in the operating system fetching and starting up step S12 after the stored information of the memory is cleared in the memory clearing step S1, an operating system is fetched from the outside and started up.

Thereafter, in the virus detection and identification step S13, presence of a computer virus which infects the computer system is detected and a type of the computer virus is identified under operation environment of the operating system by the operating system fetching and starting up step S12. If the infecting computer virus is detected in the virus detection and identification step S13, then in the virus extermination step S14, the computer virus which infects the computer system is exterminated.

In the virus extermination method described with reference to FIG. 1 or 2, when the computer virus infecting the computer system is to be exterminated in the virus extermination step S5 or S14, one of a means wherein a virus extermination program is executed, another means wherein re-writing of a system area of the computer system is performed based on a command, and a further means wherein physical formatting is started to effect virus extermination may be selected.

In this instance, the virus extermination program may be fetched from an external or preset emergency storage area. Further, a plurality of different virus extermination programs may be held in the external or preset emergency storage area, and in the virus extermination step S5 or S14, when the means wherein the virus extermination program is executed is selected in accordance with a virus type detected in the virus detection and identification step S1 or S13, an optimum one of the plurality of different virus extermination programs may be selectively fetched.

Alternatively, priority degrees of extermination techniques to be selected may be set in advance for each virus type which can be detected, and in the virus extermination step S5 or S14, the means wherein optimum virus extermination is performed may be selected based on the priorities in accordance with the virus type detected in the virus detection and identification step S1 or S13.

With the virus extermination method, since priority degrees of extermination techniques to be selected are set in advance for each virus type which can be detected and, in the virus extermination step S5 or S14, optimum virus extermination can performed based on the priorities in accordance with the detected virus type, extermination processing can be performed further appropriately. Consequently, the virus extermination method is advantageous in that a supporting mechanism for virus extermination by which, even if a virus cannot be exterminated using an existing virus extermination program, the virus can be exterminated flexibly and rapidly can be implemented.

Further, if presence of a computer virus is detected but the type of the virus cannot be identified in the virus detection and identification step S1 or S13, also it is possible to select the means in which physical formatting is started to effect virus extermination.

Accordingly, with the virus extermination method, if presence of a computer virus is detected but the type of the virus cannot be identified in the virus detection and identification step S1 or S13, since it is possible to select the means in which physical formatting is started to effect virus extermination in the virus extermination step, also a virus having such a character that it cannot be exterminated by the extermination program can be exterminated readily and appropriately. Consequently, protection of data and information can be achieved readily and information can be protected against destruction from the outside or the like.

As an alternative, when the means wherein physical formatting is started to effect virus extermination is selected, prior to the stage wherein the physical formatting is performed, information which is stored in the storage apparatus and allows saving may be saved into an emergency storage area set in advance.

Further, in the virus extermination method described above with reference to FIG. 1 or 2, in the operating system fetching and starting up step S4 or S12, the operating system may be fetched from an external storage apparatus for exclusive use and started up, or the operating system may be fetched from another information processing apparatus via a computer network and started up.

With the virus extermination method, since an operating system in which a virus is not resident can be fetched from another information processing apparatus via a computer network and started up to effect virus extermination in the operating system fetching and starting up step S4 or S12, the information processing apparatus itself need not manage a large amount of software for virus extermination any more, and a system of a LAN having a virus extermination function can be constructed efficiently.

Further, in the virus extermination method described above with reference to FIG. 1 or 2, it may further comprise another virus extermination step S5 or S14 of performing, when the type of the computer virus detected in the virus detection and identification step S1 or S13 is a computer virus which has a character that the computer virus infects a file, extermination of the computer virus infecting the file subsequently to the virus extermination by the virus extermination step S5 or S14.

Meanwhile, the trigger information either may be a command input from a command information inputting mechanism which composes the computer system or may be based on different software execution processing.

The computer virus mentioned hereinabove may have a character of the system infection type and/or the memory resident type.

Accordingly, in the virus extermination method, since, after information of the memory is cleared based on trigger information (the memory clearing step) and an operating system in which no virus is resident is automatically fetched and started up (the operating system fetching and starting up step), the virus check program can be executed to effect an extermination operation based on a type of a virus detected as a result of the execution of the virus check program (virus extermination step), the virus extermination method is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

On the other hand, according to the present invention, an information processing apparatus which includes a memory for storing programs and data for information processing and a processing section for executing the programs to perform various information processing comprises a virus detection and identification section for detecting a computer virus which infects the information processing apparatus and identifying a type of the detected computer virus, a virus type information registration section for registering information regarding the type of the detected computer virus identified by the virus detection and identification section into a storage area which is access-disabled in an ordinary operation of the information processing apparatus, a trigger information outputting section for outputting trigger information so that the information processing apparatus may enter a processing mode for performing virus extermination, a stored information clearing section operable in response to the trigger information from the trigger information outputting section for clearing information stored in all of those areas of the memory which are access enabled in an ordinary operation of the information processing apparatus, an operating system fetching and starting up section for fetching an operating system from the outside and starting up the operating system after the stored information is cleared by the stored information clearing section, and a virus extermination section for exterminating, in operation environment of the operating system started up by the operating system fetching and starting up section, the computer virus which infects the memory of the information processing apparatus based on the information regarding the type of the detected virus registered in the virus type information storage section.

The trigger information outputting section may output the trigger information when the computer virus which infects the information processing apparatus is detected by the virus detection and identification section, or alternatively, the trigger information outputting section may output the trigger information in response to a command input from a command information inputting mechanism which composes a computer system or a processing result of different software execution processing.

The computer virus may have a character of the system infection type and/or the memory resident type.

In the information processing apparatus, if a virus is detected by the virus detection and identification section, then information stored in the memory is cleared by the stored information clearing section and an operating system is fetched from the outside and started up by the operating system fetching and starting up section, whereafter a virus can be exterminated by the virus extermination section. Consequently, the information processing apparatus is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

Further, in the information processing apparatus, after information of the memory is cleared based on trigger information by the stored information clearing section and an operating system in which no virus is resident is automatically fetched and started up by the operating system fetching and starting up section, the virus check program can be executed by the virus extermination section to effect an extermination operation based on a type of a virus detected as a result of the execution of the virus check program. Consequently, the information processing apparatus is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

Further, according to the present invention, a computer-readable recording medium on which a virus extermination program is recorded is constructed such that it has recorded thereon a virus extermination program which causes a computer to realize a virus detection and identification function of detecting a computer virus as a software destroying factor which infects a computer system and identifying a type of the computer virus, a memory clearing function of receiving trigger information based on detection of the infecting computer virus by the virus detection and identification function and clearing information stored in all of those areas of a memory which are write-enabled in an ordinary operation of the computer system, an operating system fetching and starting up function of fetching an operating system from the outside and starting up the operating system after the stored information of the memory is cleared by the memory clearing function, and a virus extermination function of exterminating the computer virus infecting the computer system under operation environment of the operating system by the operating system fetching and starting up function.

With the computer-readable recording medium, if a virus is detected by the virus detection and identification function, then information stored in the memory is cleared by the stored information clearing function, whereafter an operating system is fetched from the outside and started up by the operating system fetching and starting up function and then a virus can be exterminated by the virus exterminating function. Consequently, the computer-readable recording medium is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

Further, according to the present invention, a computer-readable recording medium on which a virus extermination program for exterminating a computer virus as a software destroying factor which infects a computer system is recorded is constructed such that the virus extermination program recorded on the computer-readable recording medium causes a computer to realize a memory clearing function of clearing, in response to trigger information, information stored in all of those areas of a memory which are write-enabled in an ordinary operation of the computer system, an operating system fetching and starting up function of fetching an operating system from the outside and starting up the operating system after the stored information of the memory is cleared by the memory clearing function, a virus detection and identification function of detecting presence of a computer virus which infects the computer system and identifying a type of the computer virus under operation environment of the operating system by the operating system fetching and starting function, and a virus extermination function of exterminating, when the infecting computer virus is detected by the virus detection and identification function, the computer virus infecting the computer system.

With the computer-readable recording medium, after information of the memory is cleared based on trigger information by the memory clearing function and an operating system in which no virus is resident is automatically fetched and started up by the operating system fetching and starting up function, the virus check program can be executed to effect an extermination operation based on a type of a virus detected as a result of the execution of the virus check program by the virus extermination function. Consequently, the computer-readable recording medium is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

b. First Embodiment

In the following, several embodiments of the present invention are described with reference to the accompanying drawings.

Figure 3:
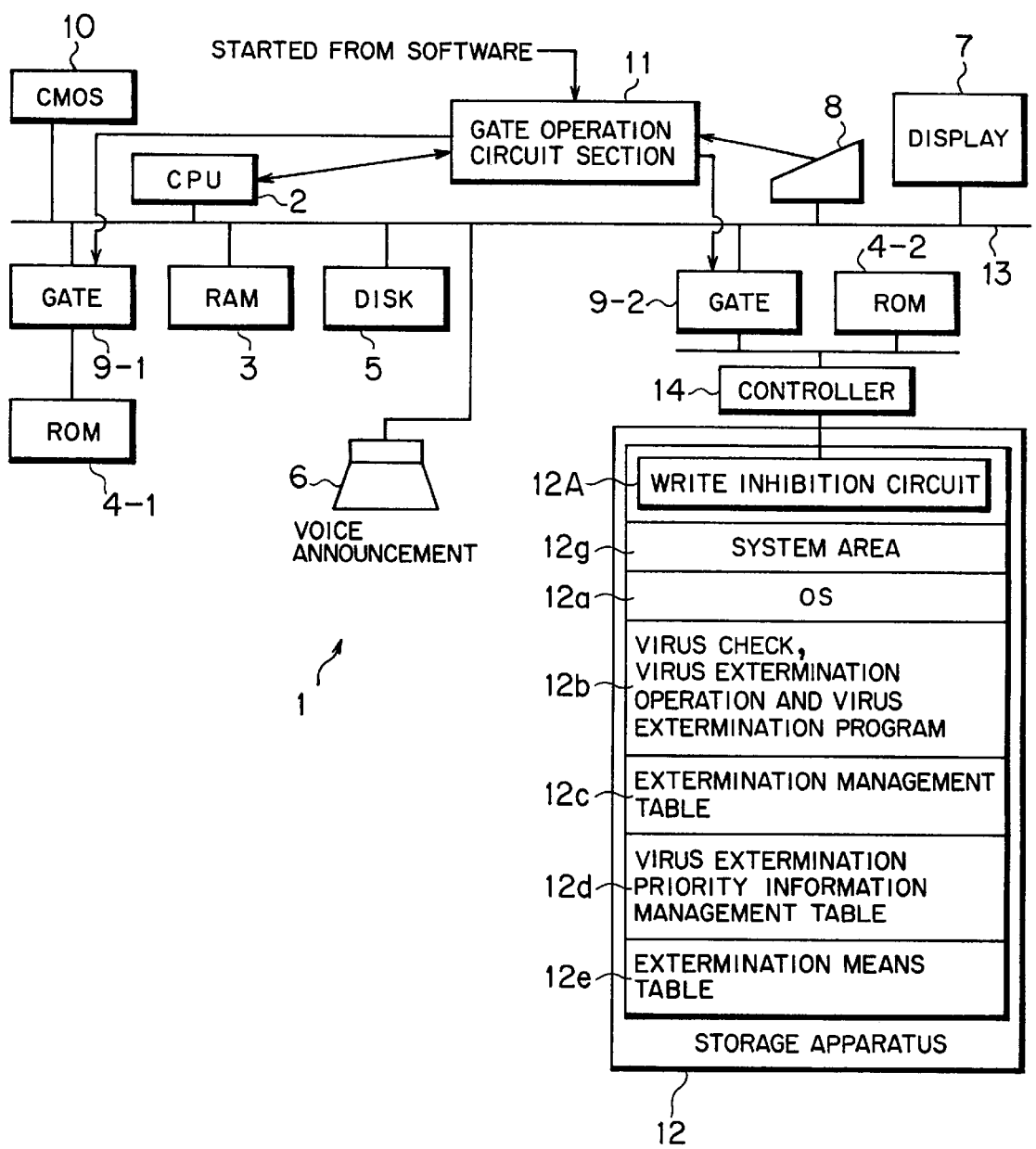
FIG. 3 is a block diagram showing an information processing apparatus with a virus extermination function to which the present invention is applied.

Referring first to FIG. 3, there is shown in block diagram an information processing apparatus with a virus extermination function to which the present invention is applied. The information processing apparatus with a virus extermination function (hereinafter referred to simply as information processing apparatus) shown is generally denoted at 1 and has a function of exterminating a computer virus (virus of the system infection type) as a software destroying factor which infects and is resident in a system area under environment wherein a program operates or a virus of the file infection type described hereinabove.

The information processing apparatus 1 includes a central processing unit (CPU) 2, a random access memory (RAM) 3, a disk apparatus 5, a voice announcement apparatus 6. a display unit 7, a keyboard 8, a pair of gates 9-1 and 9-2 and a complementary metal oxide semiconductor (CMOS) 10 which are connected to each other by a bus 13. Further, a read only memory (ROM) 4-1 is connected to the bus 13 via the gate 9-1, and another ROM 4-2 is connected to the bus 13 via the gate 9-2.

The CPU 2 performs execution control of program commands, calculation processing and so forth. The RAM 3 and the ROMs 4-1 and 4-2 store program data (command information or data information) which are used upon program execution, and can be accessed directly via the bus 13 by address designation from the CPU 2.

It is to be noted that the ROMs 4-1 and 4-2 have same addresses set by a BIOS so as to be accessed by the CPU 2, and actually, only one of the ROMs 4-1 and 4-2 allows accessing thereof depending upon the states of the gates 9-1 and 9-2.

Further, each of the RAM 3 and the ROMs 4-1 and 4-2 has a character as a volatile memory which holds data while electric energy is supplied thereto.

The disk apparatus 5 stores software information such as programs which can be executed by the information processing apparatus 1 and has a character as a non-volatile memory which can hold data without depending upon electric energy supplied thereto. The disk apparatus 5 further stores a virus detection program (virus check program) with which a computer virus which infects a system area or a file area in the information processing apparatus 1 can detect.

In other words, the disk apparatus 5 has a function as a virus detection and identification section which expands the virus detection program stored on the disk apparatus 5 into the RAM 3 and causes the CPU 2 to execute the virus detection program to detect a computer virus which infects the information processing apparatus 1 and identify a type of the detected virus.

By the way, upon starting up by an ordinary operation of the information processing apparatus 1, the CPU 2 starts up an IPL or boot stored in the system area of the disk apparatus 5 mentioned hereinabove so that an OS stored in another area of the disk apparatus 5 may be read in, and the OS is automatically started up.

In this instance, also a BIOS which constructs the system area is written into the RAM 3 described above together with the OS. Consequently, in an ordinary operation of the information processing apparatus 1, when the CPU 2 accesses the RAM 3 or the ROM 4-1 by address designation, communication of program data is performed based on contents of the BIOS mentioned above.

Further, in an ordinary operation of the information processing apparatus 1, software information stored on the disk apparatus 5 described above is copied into the RAM 3 mentioned above, and the CPU 2 performs processing such as execution of commands based on the program data stored in the RAM 3 and the ROM 4-1. Consequently, various information processing can be performed.

By the way, in the information processing apparatus 1 according to the first embodiment of the present invention, a resume function is applied so that, even if power supply is cut, information in the memories remains as it is without being erased, thereby to allow, when the power supply is thereafter made available, a continued operation to be performed continuously as it is to minimize the time required for startup.

The voice announcement apparatus 6 is formed from a loudspeaker or a like apparatus and outputs, for example, information to be notified to the outside as voice information by program execution. The display unit 7 displays an operation condition of the information processing apparatus 1 on a screen thereof. The keyboard 8 is manually operated to input data to or control an operation of the information processing apparatus 1.

The gate 9-1 is provided for switching between access enabled and disabled conditions of the CPU 2 to the ROM 4-1 and has a function as a first gate circuit. The gate 9-2 is provided for switching between access enabled and disabled conditions of the CPU 2 to the ROM 4-2 and has a function as a second gate circuit.

The CMOS 10 is provided to store a name of a virus detected as a result of execution of the virus detection program, which will be hereinafter described, for example, as flag information and hold an infection drive number and drive information. It is to be noted that, as an apparatus for storing such flag information and other information as just mentioned, for example, a flash memory or a like memory may be used in place of the CMOS 10.

Figure 4:
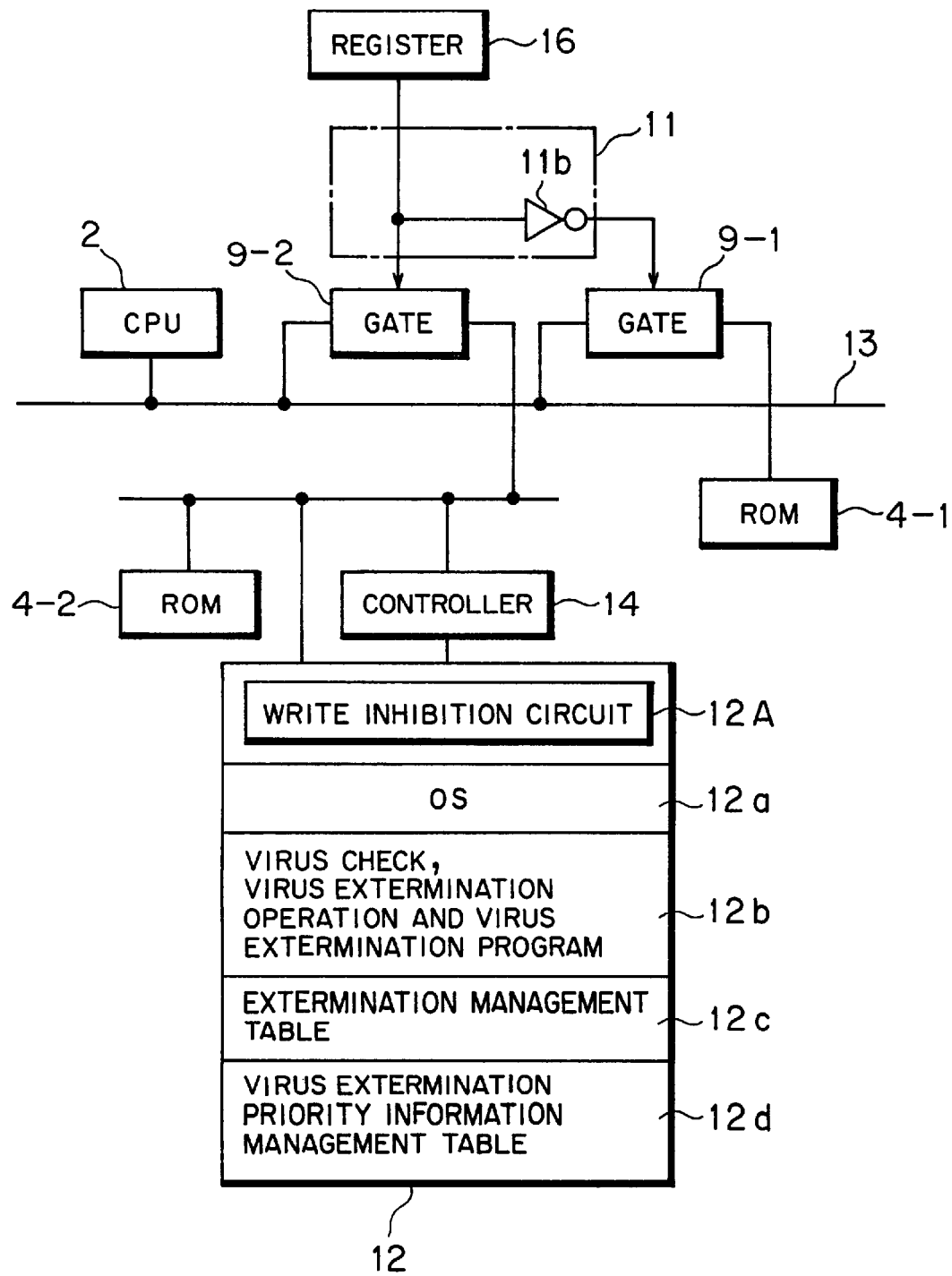
FIG. 4 is a block diagram showing part of the information processing apparatus with a virus extermination function of FIG. 3.

The information processing apparatus 1 shown in FIG. 3 further includes a gate operation circuit section 11 which switches the operation mode of the information processing apparatus 1 between an ordinary processing mode and a virus extermination mode in response to trigger information based on information of a result of execution of the virus detection program. To this end, the gate operation circuit section 11 includes a NOT circuit 11*b* as seen in FIG. 4.

More particularly, if information of a result of execution of the virus detection program set to hardware such as a register 16 represents that no virus has been detected, then the gate operation circuit section 11 notifies the CPU 2 of the information and sets the operation mode of the information processing apparatus 1 to the ordinary processing mode.

Meanwhile, the gate operation circuit section 11 outputs control signals to the gates 9-1 and 9-2 to switch them so that the gate 9-1 may have a connection station and the gate 9-2 may have a disconnection state. In this instance, the CPU 2 operates in the ordinary processing mode as the operation mode thereof.

On the other hand, if the information of a result of execution of the virus detection program which represents that a virus has been detected is set in the register 16 or a command is inputted from an inputting/outputting apparatus such as the keyboard 8 in response to detection of a virus, then the gate operation circuit section 11 notifies the CPU 2 of the command as trigger information and outputs control signals to the gates 9-1 and 9-2 to switch them so that the gate 9-1 may be put into a disconnection state and the gate 9-2 may be put into a connection state. Consequently, if a virus is detected, then the CPU 2 operates in the virus extermination mode as the operation mode thereof.

In other words, if a virus is detected as a result of execution of the virus detection program, then this is used as trigger signal to switch the operation mode of the CPU 2 from the ordinary processing mode to the virus extermination mode for performing virus extermination and switch the gates 9-1 and 9-2 so that the gate 9-1 may be put into a disconnection state and the gate 9-2 may be put into a connection state.

Consequently, when the information processing apparatus 1 is put into the ordinary processing mode, the ROM 4-2 is put into a disconnection state while the ROM 4-1 is effectively connected to the bus 13 via the gate 9-1, but when the information processing apparatus 1 is put into the operation mode for performing virus extermination, the ROM 4-1 is put into a disconnection state while the ROM 4-2 is effectively connected to the bus 13 via the gate 9-2.

In other words, the gate 9-1 effects switching between the access enabled and disabled conditions of the CPU 2 to the RAM 3 and the ROM 4-1 based on the trigger information, and effects switching between the access enabled and disabled conditions of the CPU 2 to the ROM 4-2 based on the trigger information.

The information processing apparatus 1 further includes a storage apparatus 12 which stores various programs for performing virus extermination. The storage apparatus 12 includes a write inhibition circuit 12A for inhibiting writing from the outside.

The write inhibition circuit 12A inhibits a data writing operation into such areas as a save data area 25 such as an extermination management table which will be hereinafter described, a system area 12g other than a working area and an area 12a for storing the OS. The write inhibition circuit 12A operates such that it discriminates, when a write signal is received, whether or not an address signal indicates a write inhibition area of the storage apparatus 12, and if the address signal indicates the write inhibition area, then the write inhibition circuit 12A inhibits the writing operation, but in any other case, the write inhibition circuit 12A permits data writing.

In other words, the storage apparatus 12 and the ROM 4-2 function as a virus type information registration section which registers information regarding the type of the detected virus identified by the virus detection and identification section into a storage area which cannot be accessed in an ordinary operation of the information processing system 1.

The storage apparatus 12 has, in addition to the system area 12g for storing an initialization program such as an IPL, a boot or a BIOS and the area 12a for storing a clean OS (for example, a DOS) which is not infected with a virus as one of various programs for performing such virus extermination described above, an area 12b for storing a virus check, a virus extermination operation and a program for a virus extermination operation and so forth, an area 12c for storing information regarding the extermination management table, an area 12d for storing a virus extermination priority information management table, and an area 12e for storing a virus extermination means table.

The information processing apparatus 1 further includes a controller 14 which clears, when the ROM 4-2 is effectively connected to the bus 13 via the gate 9-2, the RAM 3 based on the BIOS stored in the ROM 4-2 to stop the resume function, and thereafter loads the OS and so forth into the RAM 3 based on the IPL or boot stored in the storage apparatus 12 so that system environment which is not infected with a virus can be established.

In particular, if the processing mode of the information processing apparatus 1 is switched to the virus extermination mode by the gate operation circuit section 11 described above, then the CPU 2 clears, based on the BIOS written in the ROM 4-2, information stored in those areas (including a predetermined area on the disk apparatus 5 which is used as a virtual memory) which are used as a write enabled memory when the information processing apparatus 1 is in the ordinary processing mode such as the area of the RAM 3 to stop the resume function.

The CPU 2, ROM 4-2 and gate operation circuit section 11 cooperatively function as a stored information clearing section which clears, in response to trigger information, information stored in all of those areas of the RAM 3 which can be accessed in an ordinary operation of the information processing apparatus 1.

Further, after stored contents of the RAM 3 are cleared, interruption is re-established, and thereafter, an OS in which no virus is resident is fetched from the storage apparatus 12 and started up. Accordingly, the CPU 2, ROM 4-2 and storage apparatus 12 described above cooperate with each other to construct an operating system fetching and starting up section.

Furthermore, the RAM 3 which stores the OS fetched from the storage apparatus 12 and started up has no virus resident therein. Consequently, virus infection which is otherwise caused by operation of an infected OS and originates from the resume function is prevented.

In other words, if the gate 9-2 is switched into a connection state by the gate operation circuit section 11, then the controller 14 copies an initialization program and so forth recorded in the system area of the storage apparatus 12 into the RAM 3 to re-start the information processing apparatus 1, and the CPU 2 of the information processing apparatus 1 thus re-started can read out data stored in the storage apparatus 12 via the ROM 4-2 in order to effect virus extermination.

Subsequently, various functions provided by software stored in the storage apparatus 12 of the information processing apparatus 1 for realizing the function of the information processing apparatus 1 for performing virus extermination are described with reference to FIG. 5.

In particular, the software stored in the storage apparatus 12 for realizing the function of the information processing apparatus 1 for performing virus extermination includes an OS 12-1 stored in the area 12a, a virus check program 12-2, a virus extermination operation program 12-4 and virus extermination programs 12-5 stored in the area 12b, an extermination management table 12-6 stored in the area 12c, and a virus extermination priority information management table 12-7 and an extermination means table 12-8 stored in the area 12d.

The OS 12-1 is a control program for performing control when various programs are to be operated in the information processing apparatus 1. The virus check program 12-2 is used to detect a virus with which the system area or the file area in the information processing apparatus 1 is infected.

Further, the virus extermination operation program 12-4 is used to select or determine a virus detection means in accordance with a type of a virus detected and identified as a result of execution of the virus check program 12-2 described above and guide a virus extermination operation procedure for the selected or determined virus extermination means when necessary.

The virus extermination programs 12-5 are programs for performing virus extermination in an optimum fashion in accordance with a pattern of a virus by program processing. At least more than one such virus extermination programs 12-5 are stored in the area 12b.

Figure 6:
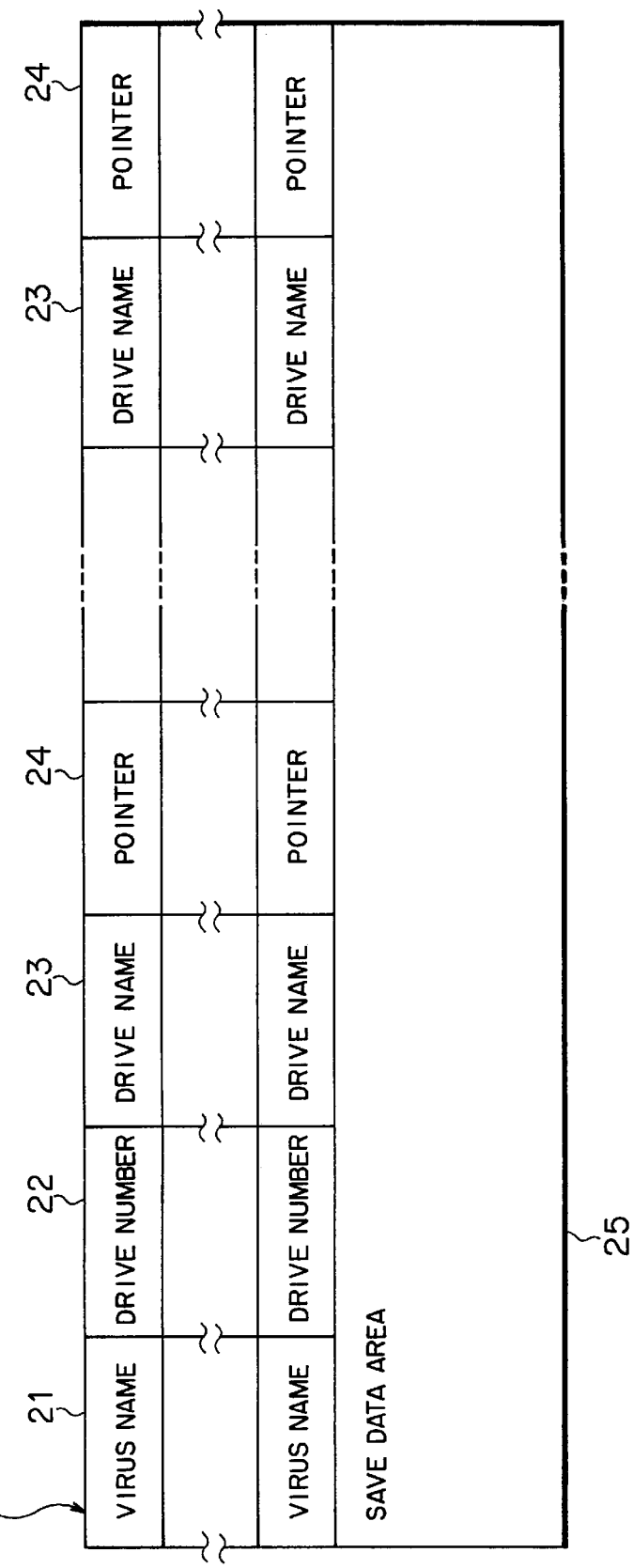
FIG. 6 is a diagrammatic view illustrating an extermination management table employed in the information processing apparatus with a virus extermination function of FIG. 3.

The extermination management table 12-6 stores, for example, as seen in FIG. 6, for each of viruses with which, for example, the disk apparatus 5 of the information processing apparatus 1 is system infected, virus name information 21, drive number information 22, drive name information 23 and pointer information 24 and includes the save data area 25 for saving files in the system infected drive.

The pointer information 24 represents a top pointer of the file in the drive saved in the save data area 25 so that the drive name information 23 infected with a virus and the saved position of the file in the drive may be linked with each other.

More particularly, the drive information 22 and 23 from which a virus has been detected newly are linked with a free top pointer of the save data area 25, and the file in the drive can be saved into the save data area 25 linked with the drive information 22 and 23.

Further, if such an operation mode that all files are written into the save data area 25 for virus extermination is set at a point of time when a writing operation into the system area of the RAM 3 is performed, then even at a point of time when a clean OS is started up as a virus encrypts the files, it is possible to exterminate a virus and restore information of a disk having infected data and so forth to prevent destruction of data by the virus.

Furthermore, the virus extermination priority information management table 12-7 indicates an order of extermination techniques to be selected preferentially based on a type of a virus. In particular, the virus extermination priority information management table 12-7 stores, as seen in FIG. 7(a), an extermination flag 27, priority extermination information 28, extermination information 29 and virus extermination program information 30 for each virus name 26.

The extermination flag 27 is used to set a control mode when a virus extermination operation program 12-3 is executed to exterminate a virus based on a type of the virus, and includes flags 27a to 27g as bit information as seen in FIG. 7(b).

In particular, the flag 27a represents whether or not FDISK (virus extermination by a command) or priority degree information can be deleted. The flag 27b represents whether or not virus extermination is possible by the virus extermination program 12-5. The flag 27c represents by bit information whether or not extermination by a SYS (system) command is possible. The flag 27d represents whether or not virus extermination by physical formatting is possible.

The flag 27e represents whether or not the virus is of the system infection type while the flag 27f represents whether or not the virus is of the file infection type. The flag 27g represents whether or not it is necessary to automatically save, upon starting up of the system, data stored in an infected medium.

Meanwhile, in the area of the priority extermination information 28, as seen in FIG. 7(c), a number 28a of extermination techniques is recorded at the top in accordance with a type of a virus, and in accordance with the number 28a of extermination techniques, code information 28b of extermination types (extermination techniques) is registered in a descending order of priority degrees based on the degree of appropriateness with which the extermination type should be adopted as an applicable extermination technique.

For example, the virus extermination technique by physical formatting+file copying processing is coded as "0001"; the extermination technique by the virus extermination program 12-5 is coded as "0002"; the extermination technique by a SYS command is coded as "0004"; the extermination technique by FDISK/MBR is coded as "0008"; and the extermination technique by deletion of a file is coded as "0010". The codes of the techniques are registered in the code information 28b.

By the way, the virus extermination program 12-5 as one of the virus extermination means described above effects, when it is executed by the information processing apparatus 1, optimum virus extermination in accordance with a pattern of a virus by program processing as described above. The virus extermination programs 12-5 is fetched from the outside or the storage apparatus 12 which is set as an emergency storage area in advance.

The SYS command which is used as one of the virus extermination means re-writes a boot area which composes the system area. More particularly, using the SYS command, re-writing of the boot area of a medium which corresponds to a drive name read from the CMOS 10 is performed to exterminate a virus which infects the system area.

The FDISK/MBR which is used as one of the virus extermination techniques clears only the IPL part of a hard disk. More particularly, by the FDISK/MBR, a drive name is read in from the CMOS 10 and re-writing of the IPL area of a medium corresponding to the drive name is performed to exterminate a virus which infects the system area.

Meanwhile, the area of the extermination information 29 is used to record limitation information to extermination such as, for example, extermination priority recommendation information or extermination history information to be used when a virus extermination technique is adopted based on the priority degree described above.

On the other hand, where a plurality of virus extermination programs 12-5 are registered from among the extermination techniques registered in the priority extermination information 28 described above, different priority degrees are provided to the virus extermination programs 12-5 to allow such setting that a virus extermination program 12-5 having a comparatively high priority degree may be executed to effect virus extermination.

In particular, in the area of the virus extermination program information 30, types of the virus extermination programs 12-5 and pointer information and priority degree information corresponding to file names are recorded. More particularly, for example, as seen in FIG. 8, the virus extermination program information 30 includes a registration number 30a, priority degrees 30b, extermination means pointers 30c and extermination method text pointers 30d.

The registration number 30a represents a number of virus extermination programs 12-5 registered in the priority extermination information 28 described above. The priority degrees 30b represent priority degrees of the virus extermination programs to be adopted as an extermination technique based on the type of the virus extermination program and the file name. The extermination means pointers 30c represent pointer information linked with the area 12b in which the registered virus extermination programs are stored individually.

Consequently, where a plurality of virus extermination programs 12-5 are registered as virus extermination means, different priority degrees are provided among the virus extermination programs 12-5 so that a virus extermination program 12-5 having a comparatively high priority degree may be executed to effect virus removal.

Figure 5:
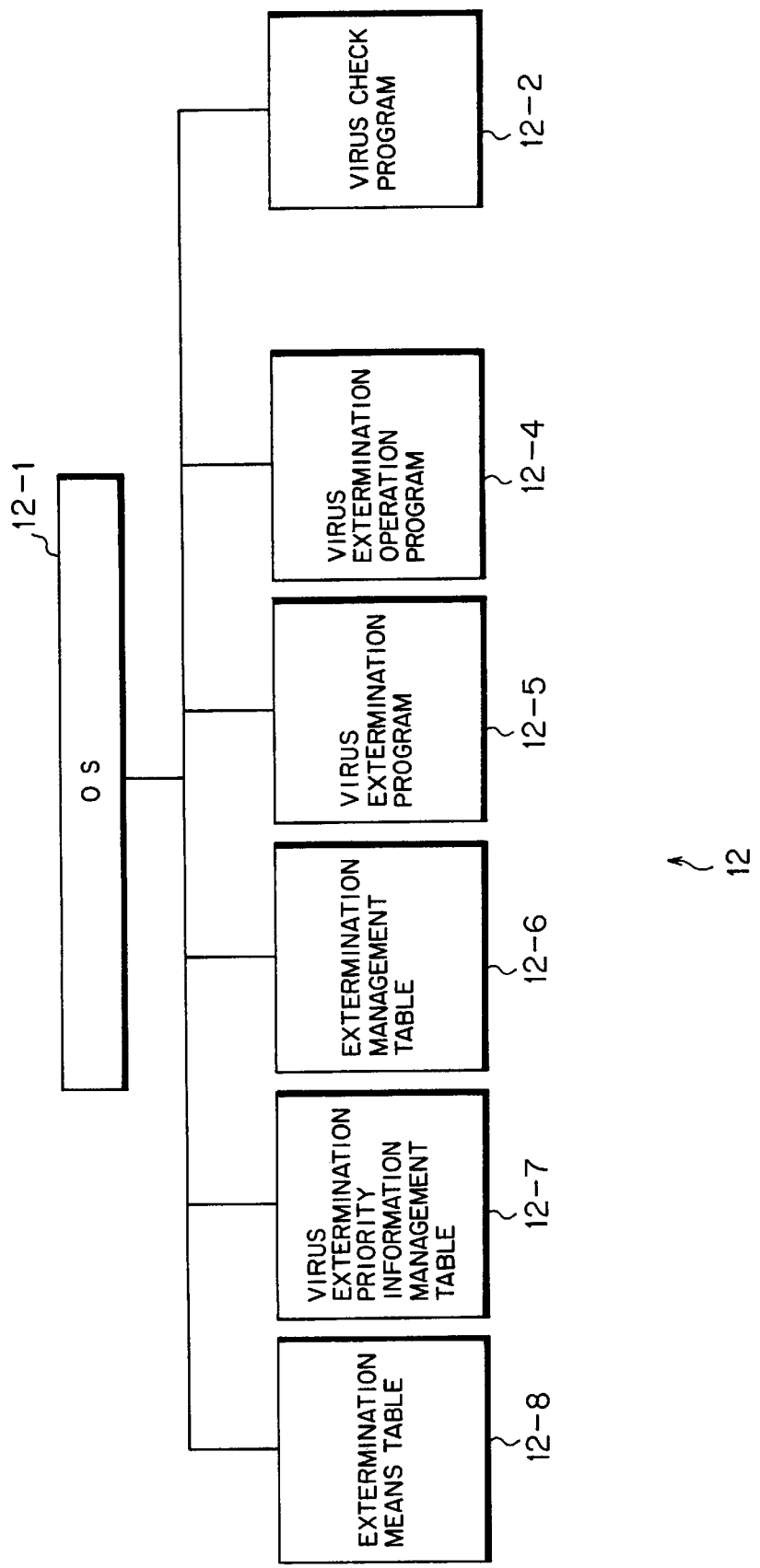
FIG. 5 is a block diagram illustrating various functions by software stored in a storage apparatus of the information processing apparatus with a virus extermination function of FIG. 3.

By the way, the extermination means table 12-8 shown in FIG. 5 is used to extract, when a virus extermination technique is to be selected without depending upon such an extermination priority degree as described above during execution of the virus extermination operation program 12-3, pointer information corresponding to the selected extermination means. To this end, the extermination means table 12-8 particularly has such a construction as shown in FIG. 9.

Referring to FIG. 9, into the extermination means table 12-8, number information 31a of the virus extermination programs 12-5 stored in the area 12b and names 31b and pointer information 31c (values linked with the positions on the area 12b at which the virus extermination programs 12-5 are recorded) of the virus extermination programs 12-5 are recorded.

An outline of operation of the information processing apparatus 1 according to the first embodiment of the present invention having the construction described above is described with reference to a flow chart of FIG. 10.

When the information processing apparatus 1 is operating in the ordinary processing mode, various programs started by the OS stored in the disk apparatus 5 operate.

In particular, the gate 9-1 is switched to a connection state, and software information stored on the disk apparatus 5 described above is copied into the RAM 3 and the CPU 2 performs processing such as execution of commands based on program data stored in the RAM 3, ROM 4-1 and so forth to effect various information processing.

Here, the information processing apparatus 1 is caused to operate as a virus detection and identification section by causing the information processing apparatus 1 to execute the virus check program stored on the disk apparatus 5 to check whether or not the inside (system area or file area) of the information processing apparatus 1 is infected with a virus.

It is to be noted that the execution of the virus check program may be started in response to an instruction by an operator or may alternatively be started upon startup of the information processing apparatus 1 or else may automatically be started up after each fixed interval of time.

If a virus which, for example, is resident in the RAM 3 and thus infects the information processing apparatus 1 is detected as a result of the execution of the virus check program, then a notification representing this is delivered to the gate operation circuit section 11 by setting some hardware (for example, the register 16). Also a type of the detected virus is identified, and the number of drives on the disk apparatus 5 from which a virus has been detected and the drive information are stored into the CMOS 10 together with the identified virus type (distinction between the system infection type and the file infection type and the virus name).

Upon reception of the notification of virus detection described above, the gate operation circuit section 11 puts the gate 9-2 into a connection state to set the information processing apparatus 1 to the operation mode for performing virus extermination.

More particularly, if a virus which infects the information processing apparatus 1 is detected, then the CPU 2 clears information stored in all areas of the memories which are write-enabled in an ordinary operation of the information processing apparatus 1 such as the RAM 3.

Further, the controller 14 copies the initialization program such as an IPL, boot or BIOS recorded in the system area of the storage apparatus 12 into the RAM 3. Then, the IPL having been copied into the RAM 3 is started up automatically so that the information processing apparatus 1 is re-started (step A1).

Then, the CPU 2 deletes all stored contents of the RAM 3 as an object with which resuming control is proceeding with the BIOS stored in advance in the ROM 4-2 to stop the resume function (memory clearing step, step Add). Thereafter, the OS 12a stored in the storage apparatus 12 and infected with no virus is started up (operating system fetching and starting up step, step A3). In other words, after the stored information of the RAM 3 and so forth is cleared, an operating system which is not infected with any virus is fetched from the outside and started up.

After the OS 12a infected with no virus is started up, the CPU 2 fetches the virus extermination operation program 12-3 stored in the area 12b of the storage apparatus 12 and executes the virus extermination operation program 12-3. It is to be noted that also table data (refer to reference symbols 12-6 to 12-7) necessary for execution of the virus extermination operation program 12-3 described hereinabove can be suitably read out during execution of the program to store necessary data into the RAM 3 (step A4).

If an optimum virus extermination technique is selected in response to a setting mode (for example, setting of a dip switch) upon starting which will be hereinafter described as a result of execution of the virus extermination operation program 12-3 described above, then extermination of the virus resident in the disk apparatus 5 and so forth is performed in accordance with a procedure of the selected virus extermination technique (virus extermination step, step A5).

In other words, a virus resident on the disk apparatus 5 can be exterminated in operation environment of the OS 12a started up in step A3.

Thereafter, whether or not the virus infecting the information processing apparatus 1 has been successfully exterminated by the virus extermination processing described above is conformed by causing the virus check program 12-2 to be executed. If the extermination of the virus has been completed, then a notification representing this is delivered to the gate operation circuit section 11 by setting this to some hardware.

When the notification of the completion of the virus extermination mentioned above is received, the gate operation circuit section 11 puts the gate 9-1 into a connection state and puts the gate 9-2 into a disconnection state to switch the control to the BIOS which is used in an ordinary operation (stored on the disk apparatus 5) to re-start the OS. Further, the gate operation circuit section 11 restores the resume setting, which has been in a stopped condition, to return the processing to ordinary processing (from the YES route of step A6 to step A7).

On the other hand, if the result of execution of the virus check program 12-2 reveals that a virus which infects the information processing apparatus 1 have not successfully been exterminated by the virus extermination processing described above and another virus to be exterminated remains resident in the information processing apparatus 1, then the virus extermination operation program 12-3 stored in the area 12b of the storage apparatus 12 is executed again to effect virus extermination processing in a similar manner as described above (from the NO route of step A6 to step A4).

Figure 11:
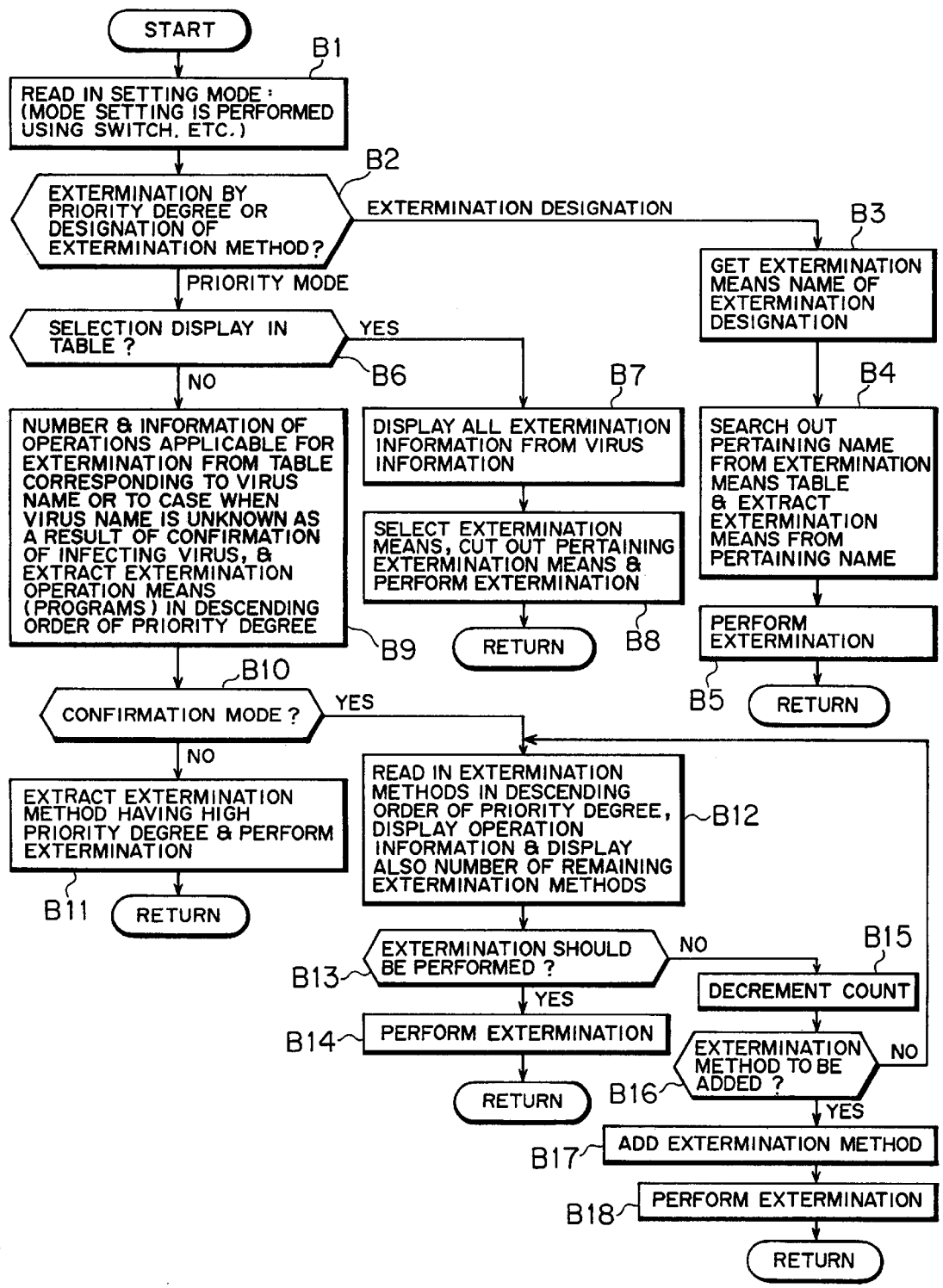

Subsequently, the virus extermination processing in steps A4 and A5 described above (execution processing of the virus extermination operation program 12-3) is described in detail with reference to the flow chart of FIG. 11.

In particular, a virus is detected as a result of execution of the virus detection program and the OS 12a which is not infected with any virus is started up, and the program 12-3 or 12-5 for virus extermination is read out and executed. In this instance, an infected drive number and drive information stored in the CMOS 10 are read out together with a virus name (including a type of the virus) as flag information and written into the management table 25 beginning with the free top area.

Further, a setting mode (setting, for example, of whether or not a priority degree should be used by a dip switch or the like) according to the extermination selection technique of the virus extermination operation program 12-3 is read in (step B1). The setting mode may be, for example, a setting mode for selection of an extermination technique based on a priority degree set in advance or another setting mode for acceptance of a designation of an extermination technique from the outside without using a priority degree.

If the setting mode read in from the virus extermination operation program 12-3 is the setting mode for acceptance of a designation of an extermination means from the outside (for example, an operator), a necessary display is provided by the voice announcement apparatus 6 or the display unit 7 to make a request for designation of an extermination technique and a designation of an extermination means name is accepted (from the "extermination designation" route of step B2 to step B3).

After a designation of an extermination means name is accepted, the extermination means table 12-8 (refer to FIG. 9) is referred to to fetch an extermination means name 31$b$ corresponding to the designated extermination means (step B4), and processing linked with pertaining pointer information 31$c$ is performed. Consequently, the virus can be exterminated (step B5).

It is to be noted that the processing which may be linked with the pointer information 31$c$ mentioned above to effect virus extermination may be processing for starting a virus extermination program 12-5, or any software processing which can cause any one of extermination processing by physical formatting+file copying, extermination processing by a SYS command, extermination processing by FDISK/MBR or extermination processing by deletion of a file to be performed.

By the way, if a result of reading in of the setting mode of the virus extermination operation program 12-3 described above reveals that the setting mode is the method of selecting an extermination means based on a priority set in advance, then the information processing apparatus 1 operates in the following manner by execution of the virus extermination operation program 12-3 (the "priority mode" route of step B2).

In other words, in the present setting mode, priority degrees of extermination techniques to be selected are set in advance for each type of a virus which can be detected, and when virus extermination is to be performed, an optimum virus extermination method can be selected based on the priority degree in accordance with a type of a virus detected as a result of execution of the virus check program.

Here, if the system is set such that extermination means based on priority degrees are displayed in a table so that, for example, an operator may designate one of the displayed extermination means, the CPU 2 refers to the priority extermination information 28 of the virus extermination priority information management table 12-7 based on a virus name (flag information) read out from the CMOS 10 to display all of the extermination means registered as such based on the priority degrees in a table using the display unit 7 or the like (from the YES route of step B6 to step B7).

If the operator selectively designates a suitable one of the extermination means based on the display, then the CPU 2 starts processing for execution of extermination of the corresponding virus based on the pointer information 30$c$ and 30$d$ corresponding to the designated extermination means on the virus extermination program information 30 to exterminate the virus (step B8).

In other words, when to exterminate a virus resident in the computer system, one of a means wherein a virus extermination program 12-5 is executed, another means wherein re-writing of the system area of the computer system based on a command (SYS command or FDISK/MBR) is performed and a further means wherein physical formatting is started to effect virus extermination can be selected.

In contrast, in the setting mode wherein virus extermination is performed based on a priority degree but a table of extermination means is not displayed, the CPU 2 confirms an infecting virus from a virus type and a virus name (flag information) read out and refers to the virus extermination priority information management table 12-7 to extract the number of means applicable for extermination and information regarding the means applicable for extermination (names of the extermination means and so forth), which correspond to the virus type and the virus name, together with priority degrees (from the NO route of step B6 to step B9).

In particular, if both of the virus type and the virus name read out from the CMOS 10 do not coincide with those on the virus extermination priority information management table 12-7, then the two viruses are not determined to be the same virus. For example, two such viruses that coincide only in virus name with each other are determined to be different viruses.

It is to be noted that, even if the name of the virus in question is unknown, information similar to that described above can be extracted by referring to a pertaining area of the virus extermination priority information management table 12-7.

Here, if the setting mode of the information processing apparatus 1 is such a mode that, if an extermination means which is highest in priority degree is extracted from the virus extermination priority information management table 12-7 as described above, then virus extermination processing in which the extracted extermination means is used can be entered automatically without any confirmation of an operator beforehand, then the pertaining virus extermination processing is entered immediately (from the NO route of step B10 to step B11).

More particularly, pointer information of the extracted extermination means is extracted by referring to the extermination means table 12-8, and a virus extermination program 12-5 for performing virus extermination is started when necessary so that the virus may be exterminated.

In other words, priority degrees of extermination techniques to be selected are set in advance for each of types of viruses which can be detected, and when to perform virus extermination, the virus check program is executed, and optimum virus extermination can be performed based on the priority degrees in accordance with a type of a virus detected as a result of the execution of the virus check program.

On the other hand, if the setting mode of the information processing apparatus 1 is a mode wherein virus extermination is not performed automatically but confirmation of an operator is required beforehand, the extermination means table 12-8 is referred to based on extermination means extracted in the descending order of the priority degree as described above to extract a virus extermination program 12-5 (for example, the virus extermination program) for performing extermination of a pertaining virus).

Then, together with information of the name and so forth of the extermination means which is highest in priority degree, information of the number of kinds of the remaining extermination techniques registered as such extermination means is displayed on the display unit 7 to make a request for conformation of the operator (an instruction to perform an extermination operation by the displayed extermination means) (step B12).

It is to be noted that, where a plurality of kinds of virus extermination programs 12-5 are registered as extermination means, an optimum one of the different virus extermination programs can be displayed as an extermination means which is highest in priority degree in accordance with the type of the virus detected by the operation of the virus check program.

Here, if the operator wants to perform virus extermination using the extermination means displayed on the display unit 7, then the operator refers to the extermination means table 12-8 based on the extermination means names extracted in the descending order of the priority degree as described above in response to the notification of confirmation from the operator to extract and execute a program (for example, a virus extermination program) 12-5 for performing extermination of the pertaining virus. Consequently, the virus whose infection has been detected as described above can be removed (from the YES route of step B13 to step B14).

On the other hand, if a virus extermination technique is not to be performed using the extermination means extracted in such a manner as described above in response to an operation of the operator, then the value (value set to a counter or the like) of kind number information of the remaining extermination techniques registered as the extermination means described above is decremented by "1" (from the NO route of step B13 to step B15).

Then, one of the extermination means names which has a priority degree higher next to the extermination means extracted in step B12 described above and information of the number of kinds of the remaining extermination techniques are displayed to make a request for conformation of the operator again (from the NO route of step B16 to step B12).

Here, if a new extermination means is to be added, the CPU 2 reads in a program for the new extermination means, for example, from the storage apparatus 12 when necessary, and adds the thus read in extermination means to the virus extermination priority information management table 12-7 (step B17). Then, the CPU 2 executes virus extermination using the extermination means (step B18).

Figure 10:
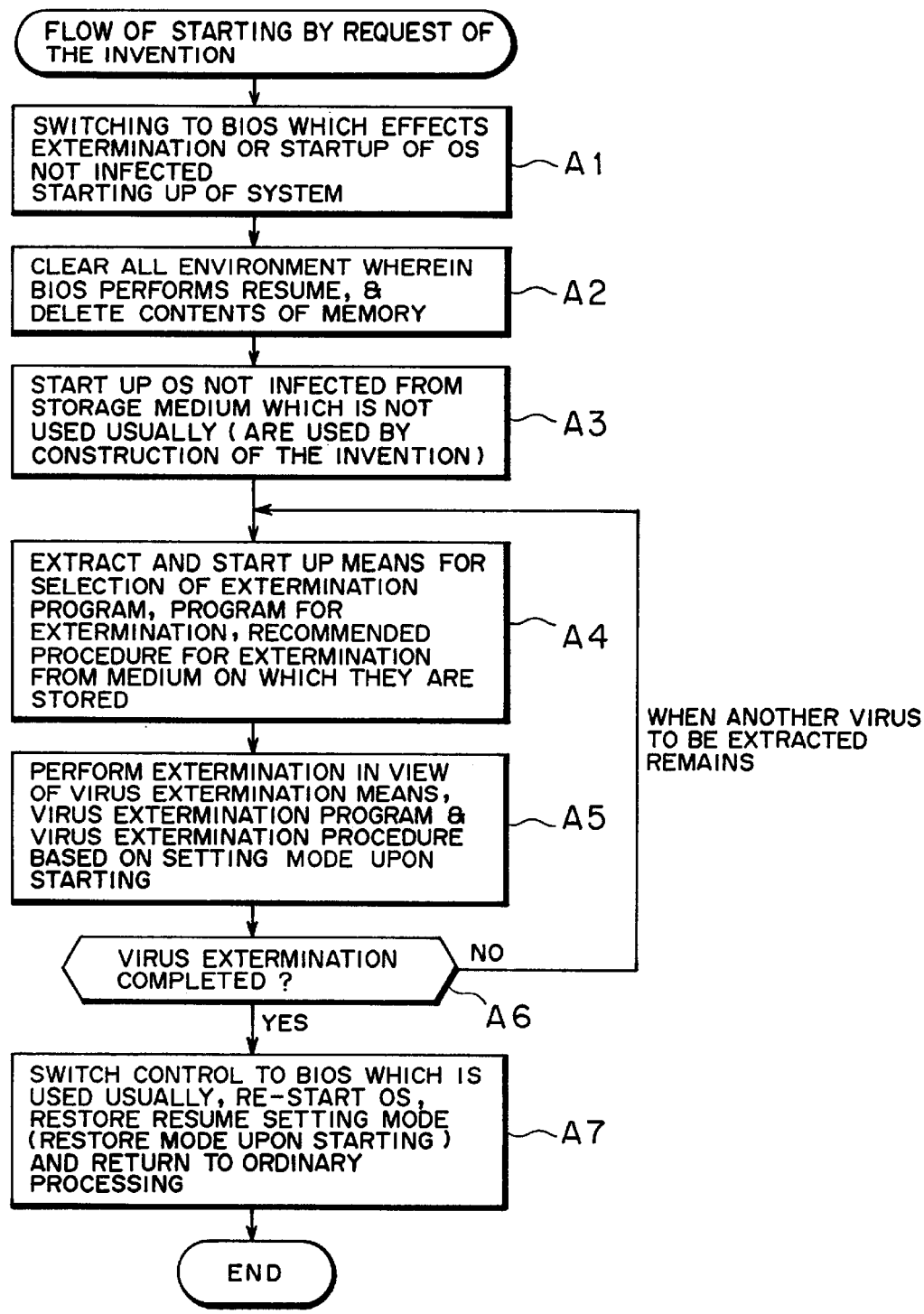
FIGS. 10 to 12 are flow charts illustrating operation of the information processing apparatus with a virus extermination function of FIG. 3.

It is to be noted that, if a result of the virus detection by the virus check program reveals detection of a virus whose virus name cannot be specified, then virus extermination by such a SYS command, FDISK/MBR or virus extermination program 12-5 as described above is performed (from the NO route of step A6 of FIG. 10 to step A4). However, even if the virus cannot be exterminated using any of the extermination means, virus extermination by physical formatting can be performed finally.

In other words, when to perform virus extermination, although presence of a virus is detected as a result of execution of the virus check program, if the name of the virus or the like cannot be identified, then physical formatting is started to effect virus extermination.

Figure 12:
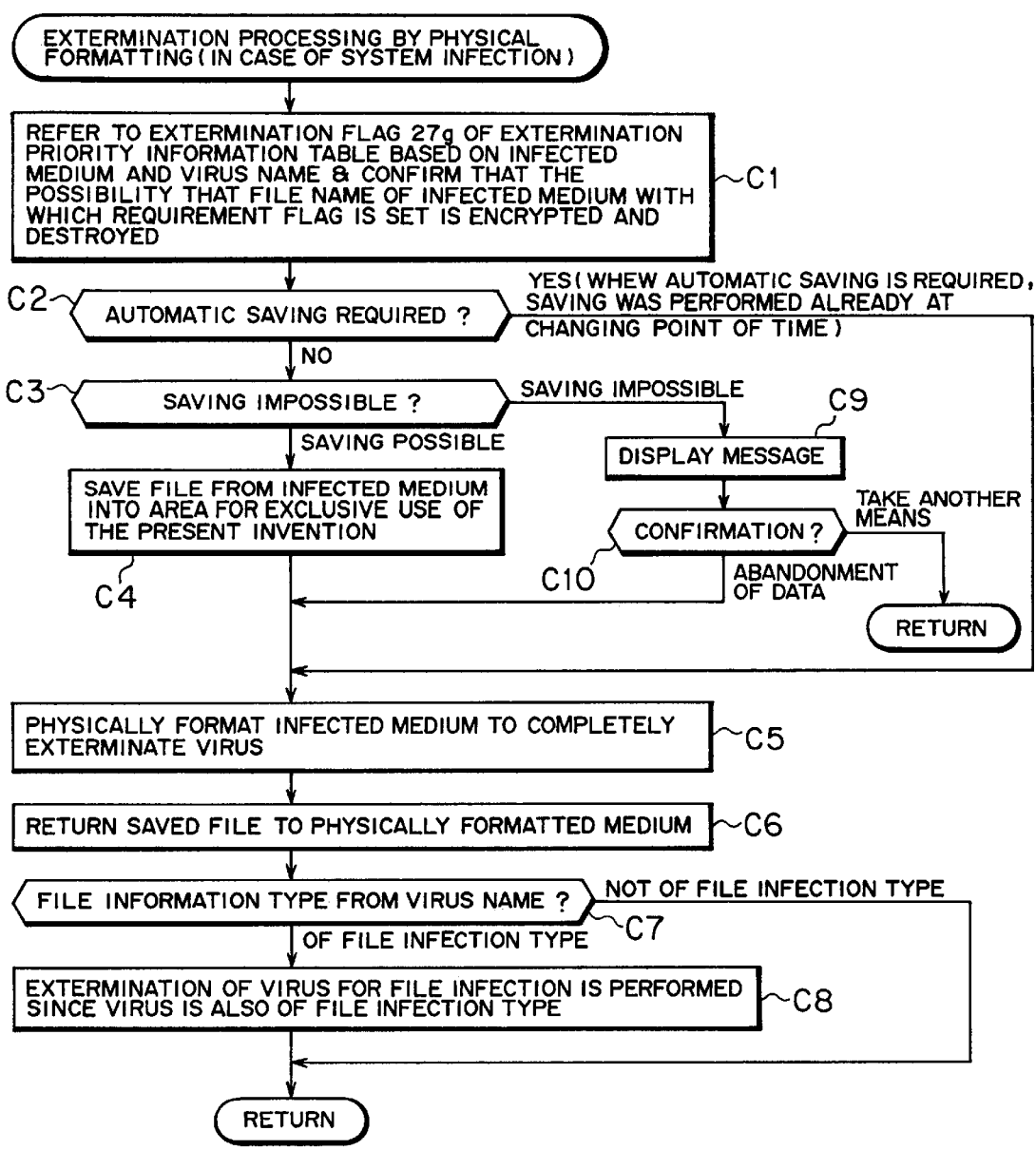

Particularly, processing when the detected virus is a virus of the system infection type and extermination of the virus is performed by physical formatting (execution processing of a virus extermination program 12-5 for performing physical formatting) is described below with reference to the flow chart of FIG. 12.

Here, in a stage preceding to performance of physical formatting, information stored in the storage apparatus 12 and possible to save is saved into an emergency storage area (save data area 25) set in advance.

Particularly in the case of, for example, a personal computer of the pre-install type wherein an OS is written in a disk apparatus in advance and a backup file is not included in a commodity package, where an extermination technique of an infecting virus by physical formatting is adopted, the OS is saved into the save data area 25 in advance.

First, the flag 27g of the virus extermination priority information management table 12-7 is referred to based on an infected medium and a virus name to confirm whether or not a flag representing that it is necessary to automatically save files when the system is started up is set (step C1). Then, if the automatic save requirement flag is set in the flag 27g described above, then the possibility that the file name of the file infected with the virus may be encrypted and destroyed is high.

Here, if the detected type of the virus has a character that automatic saving of the file is required, then also the automatic save requirement flag in the flag 27g described above is in a set state. In this instance, when the virus extermination operation program 12-4 described above is started up, the file is automatically saved into the save data area 25 of the extermination management table 12-6 (the YES route of step C2).

However, although the automatic saving requirement flag is not set in the flag 27g on the virus extermination priority information management table 12-7 corresponding to the detected virus type (the NO route of step C2), if the virus has a character that the file recorded on the infected medium (in this instance, for example, the disk medium 5) can be saved, the file is saved from the infected medium into the save data area 25 of the extermination management table 12-6 (from the "saving enabled" route of step C3 to step C4).

It is to be noted that, if the automatic saving requirement flag is not set and the virus does not have a character that the file recorded on the infected medium can be saved into the save data area 25, it is displayed by the voice announcement apparatus 6, the display unit 7 or the like that the file cannot be saved (step C9) so that the operator may confirm that the file is deleted if physical formatting is performed.

The operator who has been informed that the file cannot be saved continues the virus extermination operation by one of a technique of performing virus extermination using some other means than physical formatting and another technique of abandoning data which form the file and continuing physical formatting as it is (step C10).

It is to be noted that, when a file of an infected medium is copied into the save data area 25, at a point of time when copying of the file into the save data area 25 from the infected medium is performed, the flag 27f is referred to to confirm whether or not the infecting virus is of the file infection type (whether or not the virus is of the type which infects a file). Then, any file which is infected with a virus of the file infection type is not brought out of an object of copying, or where the virus is of the file infection type, a warning is outputted through the voice announcement apparatus 6 or the display unit 7 so that an instruction of whether or not a file should be saved may be accepted.

Further, when it is searched whether or not a virus of the file infection type is present while copying processing is proceeding, if a file is infected with a virus of the file infection type, then the virus may be exterminated to copy the file after an instruction is accepted, or the file may be copied after the virus is exterminated automatically.

After the file is saved into the save data area 25 or the data which constructs the file are abandoned as described above, the virus is exterminated completely by physically formatting the infected medium (step C5).

Where the file is saved in the save data area 25, after the physical formatting is completed, the pointer information 24 is extracted from the drive name 23 recorded in the extermination management table 12-6, and the file saved in the save data area 25 is returned to the medium, for which virus extermination has been performed, based on the pointer information 24 (step C6).

On the other hand, if the flag 27f of the virus extermination priority information management table 12-7 referred to indicates that the detected virus has a character of the file infection type, also virus extermination corresponding to file infection is performed (from the YES route of step C7 to step C8).

In other words, if the type of the virus (including the virus name) detected as a result of execution of the virus check program is a virus having a character that it infects a file, extermination of the virus which inflects a file is performed (file infecting virus extermination step) subsequently to such virus extermination as described above.

It is to be noted that, if physical formatting described above is performed in order to remove a virus whose virus name has not successfully been specified, then contents of the virus extermination priority information management table 12-7 are updated to add the information regarding the virus.

In particular, the virus name is registered into the virus extermination priority information management table 12-7, and in the corresponding extermination flag 27, the flag 27d is set to "1" representing that virus deletion by physical formatting is possible and the flag 27e is set to "1" representing that the virus is of the system infection type.

Further, the extermination priority recommendation information of the extermination information 29 is set to "null" since the number of applicable extermination means is 1, and the virus extermination program information 30 is set to "null" since the virus extermination program is not utilized.

After such extermination of viruses as described above is completed, the CPU 2 clears the virus name information 21 registered in the extermination management table 12-6, clears the drive information 22 and 23 representing drives infected with viruses to "0", moves the free top pointer of the save data area 25 by a number of written files which have been opened upon virus extermination, and clears the flag information, the drive information and so forth stored in the CMOS 10 and representative of the virus names and the virus types. Thereafter, the processing returns to such ordinary processing as described hereinabove (step A7 of FIG. 10).

In this manner, with the information processing apparatus with a virus extermination function according to the first embodiment of the present invention, since it includes the ROM 4-2, gates 9-1 and 9-2, gate operation circuit section 11 and storage apparatus 12, if a virus is detected as a result of execution of a virus check program, then it is possible to clear contents of the RAM 3, automatically fetch an operating system in which no virus is resident and effect an extermination operation suitable for the type of the virus. Consequently, the information processing apparatus with a virus extermination function according to the first embodiment of the present invention is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

Further, with the information processing apparatus with a virus extermination function according to the first embodiment of the present invention, if presence of a virus is detected but the type of the virus cannot be identified, since it is possible to select the means in which physical formatting is started to effect virus extermination, also a virus having such a character that it cannot be exterminated by the extermination program can be exterminated readily and appropriately. Consequently, protection of data and information can be achieved readily and information can be protected against destruction from the outside or the like.

Furthermore, with the information processing apparatus with a virus extermination function according to the first embodiment of the present invention, since priority degrees of extermination techniques to be selected are set in advance for each virus type which can be detected and optimum virus extermination can performed based on the priorities in accordance with the detected virus type, extermination processing can be performed further appropriately. Consequently, the information processing apparatus with a virus extermination function according to the first embodiment is advantageous in that a supporting mechanism for virus extermination by which, even if a virus cannot be exterminated using an existing virus extermination program, the virus can be exterminated flexibly and rapidly can be implemented.

It is to be noted that, while, in the operation mode by step B7 or B8 described above, virus extermination is performed by an extermination means selected by an operator, if a virus can be exterminated with certainty as a result of execution of the virus extermination by the virus extermination means, then virus extermination may thereafter be performed automatically using the extermination means.

In this instance, flags are provided at preset bit positions of the virus name information 26 and the priority extermination information 28 of the virus extermination priority information management table 12-7 before virus extermination is started. Consequently, by setting the initial values of the flags to "0" and setting the flags to "1" at a point of time when a priority order determined by extermination software corresponding to a virus name is established, it is automatically set so that virus extermination can be performed by the extermination means to perform virus extermination with certainty.

It is to be noted that, where the virus extermination operation method is applied to extermination of a virus of the file infection type. since cancellation of the resume function or memory clearing need not be performed at a point of time when detection information of file infection is received from the CMOS 10, virus extermination may be performed suitably skipping those operations.

c. Second Embodiment

Figure 13:
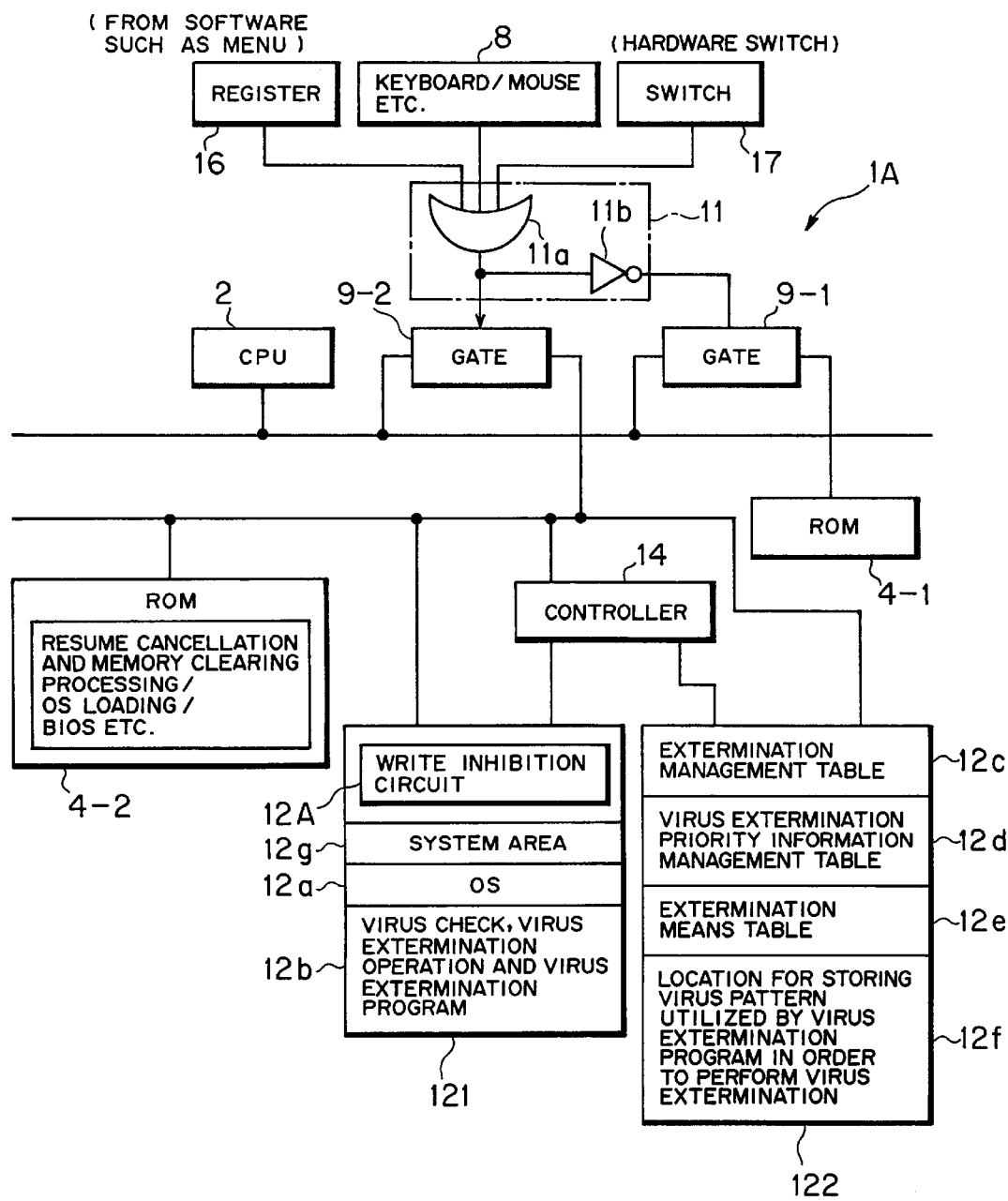
FIG. 13 is a block diagram showing part of another information processing apparatus with a virus extermination function to which the present invention is applied.

FIG. 13 shows in block diagram part of another information processing apparatus with a virus extermination function to which the present invention is applied. Referring to FIG. 13, the information processing apparatus with a virus extermination function is generally denoted at 1A and is a modification to and has a basically same construction as that of the information processing apparatus 1 of the first embodiment of the present invention described hereinabove except that it includes a gate operation circuit section 11A in place of the gate operation circuit section 11 and includes a pair of storage apparatus 121 and 122 in place of the storage apparatus 12 and that a virus check program operates after stored contents of the RAM 3 and so forth are cleared.

It is to be noted that, in FIG. 13, the RAM 3. voice announcement apparatus 6, display unit 7, keyboard 8 and CMOS 10 are omitted for simplified illustration.

In the information processing apparatus 1A shown in FIG. 13, the gate operation circuit section 11A switches the states of the gates 9-1 and 9-2 and outputs trigger information that switching of the operation mode is performed to the CPU 2 in response to an instruction (signal value set in the register 16) from software such as a menu selection program, a signal from an inputting/outputting apparatus such as the keyboard 8 or setting of a dip switch 17. To this end, the gate operation circuit section 11A includes an OR circuit 11*a* and a NOT circuit 11*b*.

The OR circuit 11*a* effectively accepts, based on a set value from the register 16, a signal from an inputting/outputting apparatus such as the keyboard 8 and setting from the dip switch 17, an instruction to start up the virus extermination operation mode if one of the signals is such instruction. By the OR circuit 11*a* and the NOT circuit 11*b*, desired instructions for starting up the virus extermination mode can be forwarded to the CPU 2 and the gates 9-1 and 9-2.

Thus, in the information processing apparatus 1A according to the second embodiment of the present invention, the virus extermination operation mode described above can be started up using an instruction from software (a menu program or the like) set in the register 16 as trigger information, or started up in response to a signal received from an inputting/outputting apparatus such as the keyboard 8 or else started up, for example, after each fixed interval of time based on setting of the dip switch 17 (for example, started up at a certain point of time of a certain day every week).

Meanwhile, the storage apparatus 121 includes a write inhibition circuit 12A which is basically similar to the storage apparatus 12 of the information processing apparatus 1 of the first embodiment described hereinabove. The storage apparatus 121 further includes a system area 12*g* for storing an initialization program such as an IPL, a boot or a BIOS and an area 12*a* for storing an OS 12-1 which is not in an infected state as well as an area 12*b* for storing a virus check program 12-2, a virus extermination operation program 12-4 and a virus extermination program 12-5.

The storage apparatus 122 includes an area 12*c* for storing an extermination management program 12-6, an area 12*d* for storing a virus extermination priority information management table 12-7, and an area 12*e* for storing an extermination means table 12-8, which are basically similar to those of the storage apparatus 12 of the information processing apparatus 1 of the first embodiment described hereinabove, as well as an area 12*f* for storing pattern information.

The pattern information stored in the area 12*f* indicates a pattern of a virus which can be exterminated by executing the virus extermination program 12-5. Thus, when the virus extermination program 12-5 described above is executed, the pattern information stored in the area 12*f* is utilized.

In this manner, the functions of the storage apparatus 12 of the information processing apparatus 1 in the first embodiment described above are divided into those of the two storage apparatus 121 and 122 in order to moderate a limitation to the storage capacity of each of the storage apparatus 121 and 122 to allow storage of virus extermination programs for a large number of virus patterns.

Operation of the information processing apparatus 1A according to the second embodiment of the present invention having the construction described above is different from that of the information processing apparatus 1 according to the first embodiment only in that a virus check program is operated after stored contents of the RAM 3 and so forth are cleared.

In particular, in the information processing apparatus 1A, if a signal from software, an inputting/outputting apparatus such as the keyboard 8 or the dip switch 17 is inputted as a trigger signal, then the gate operation circuit section 11 forwards a notification representing this to the CPU 2 and switches the states of the gates 9-1 and 9-2 to switch the processing mode of the information processing apparatus 1A from the ordinary processing mode to the processing mode for performing virus extermination.

In other words, in the information processing apparatus 1A of the second embodiment, the operation mode for performing virus extermination is entered prior to a state in which a virus check program is executed.

More particularly, the gate 9-1 is put into a disconnection state while the gate 9-2 is put into a connection state, and the CPU 2 clears contents stored in the RAM 3 and so forth.

When the connection state of the gate 9-2 is established, the ROM 4-2 is put into an access enable state. Thus, based on the BIOS stored in the ROM 4-2, the CPU 2 stops the resume function by deleting all of the stored contents of the RAM 3 as an object with which resume control is proceeding, and then starts up the OS 12*a* stored in the storage apparatus 121 and free from virus infection. In other words, after the stored information of the RAM 3 and so forth is cleared, an operating system in which no virus is resident is fetched from the outside and started up.

Figure 14:
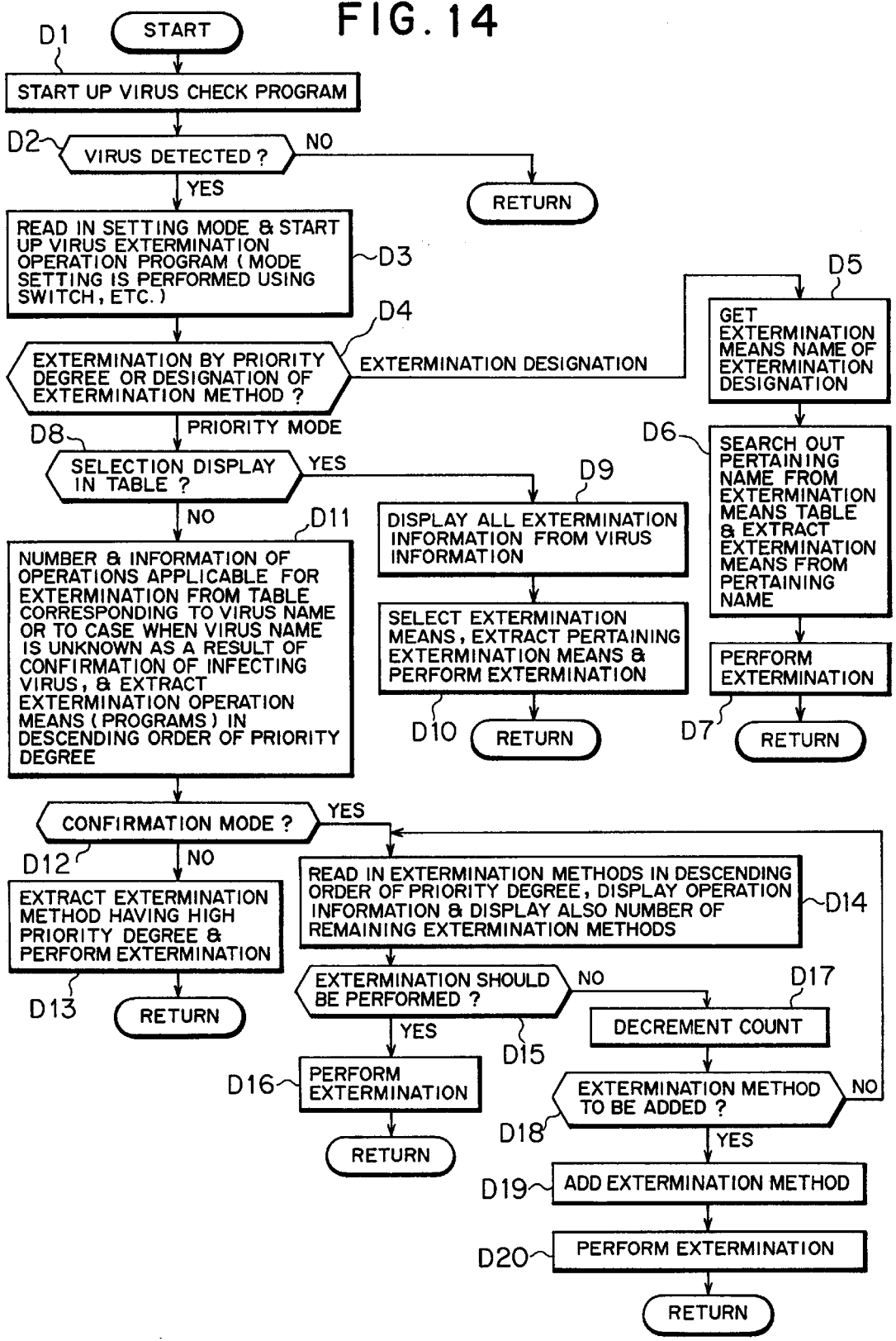
FIG. 14 is a flow chart illustrating operation of the information processing apparatus with a virus extermination function of FIG. 13.

When the operating system is automatically started up as described above, such processing for virus extermination as illustrated in a flow chart of FIG. 14 is started up (step D1).

In particular, after the operating system which is not infected with any virus is started up and the virus check program is executed, it is detected whether or not a virus is resident in the disk apparatus 5 (step D2).

If it is detected as a result of execution of the virus check program described above that a virus is resident in the disk apparatus 5, then the CPU 2 writes a virus type (including virus name) of the virus together with the number of infected drives and the drive information into the CMOS 10.

Thereafter, a setting mode for virus extermination similar to that in the information processing apparatus 1 of the first embodiment described hereinabove (that is, setting by a dip switch or the like which represents, for example, whether or not a priority degree is used) is read in, and the virus extermination operation program 12-4 is started so that virus extermination is performed (steps D3 to D20) in a similar manner as in the information processing apparatus 1 of the first embodiment (refer to steps B1 to B18 of the flow chart of FIG. 11). It is to be noted that the steps D3 to D20 of FIG. 14 correspond to the steps B1 to B18 of FIG. 11, respectively.

In this manner, with the information processing apparatus with a virus extermination function according to the second embodiment of the present invention, since it includes the ROM 4-2, gates 9-1 and 9-2, gate operation circuit section 11 and storage apparatus 12, when the information processing apparatus is to enter an operation mode for performing virus extermination based on trigger information, it is possible to clear contents of the RAM 3, automatically fetch an operating system in which no virus is resident and effect an extermination operation suitable for the type of the virus detected by execution of the virus check program. Consequently, the information processing apparatus with a virus extermination function according to the second embodiment of the present invention is advantageous in that an error in virus extermination operation by the user can be prevented and virus extermination optimum to a type of the virus can be performed without imposing much burden in operation on the user. Further, erroneous extermination or a trouble in that extermination has failed while it is expected that the extermination has been successfully performed can be eliminated quickly.

Further, with the information processing apparatus with a virus extermination function according to the second embodiment of the present invention, if presence of a virus is detected but the type of the virus cannot be identified, since it is possible to select the means in which physical formatting is started to effect virus extermination, also a virus having such a character that it cannot be exterminated by the extermination program can be exterminated readily and appropriately similarly as in the information processing apparatus with a virus extermination function according to the first embodiment. Consequently, protection of data and information can be achieved readily and information can be protected against destruction from the outside or the like.

Furthermore, with the information processing apparatus with a virus extermination function according to the second embodiment of the present invention, since priority degrees of extermination techniques to be selected are set in advance for each virus type which can be detected and optimum virus extermination can performed based on the priorities in accordance with the detected virus type, extermination processing can be performed further appropriately similarly as in the information processing apparatus with a virus extermination function according to the first embodiment. Consequently, the information processing apparatus with a virus extermination function according to the first embodiment is advantageous in that a supporting mechanism for virus extermination by which, even if a virus cannot be exterminated using an existing virus extermination program, the virus can be exterminated flexibly and rapidly can be implemented.

d. Third Embodiment

Figure 15:
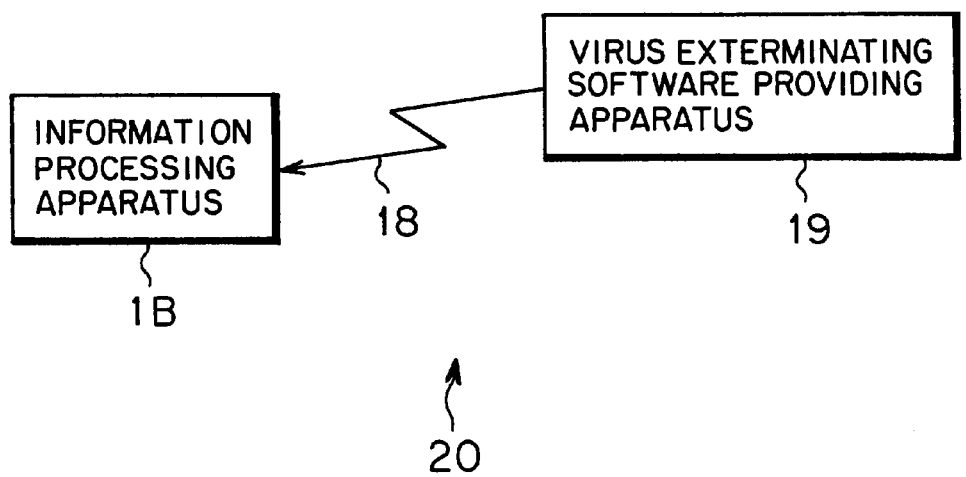
FIG. 15 is a block diagram showing an information processing system to which a virus extermination method according to the present invention is applied.

FIG. 15 shows in block diagram an information processing system to which a virus extermination method according to the present invention is applied. Referring to FIG. 15, the information processing system shown is generally denoted at 20 and includes an information processing apparatus 1B and a virus exterminating software providing apparatus 19 as another information processing system connected to each other by a computer network 18. Thus, a LAN (Local Area Network) can be composed of the information processing apparatus 1B and the virus exterminating software providing apparatus 19.

For example, in a LAN composed of the information processing apparatus 1B and the virus exterminating software providing apparatus 19, the virus exterminating software providing apparatus 19 can function as a server of a client server system while the information processing apparatus 1B functions as a client.

The computer network 18 allows communication of virus extermination software in the form of a packet conforming to the LAN described above between the information processing apparatus 1B and the virus exterminating software providing apparatus 19.

The information processing apparatus 1B can exterminate a virus infecting the inside of the apparatus itself by executing software from the virus exterminating software providing apparatus 19 and may have a hardware construction basically similar to the information processing apparatus 1 or 1A of the first or second embodiment described hereinabove. However, only an initialization program such as a BIOS is stored as software in the storage apparatus 12 (or storage apparatus 121).

The information processing apparatus 1B is different from the information processing apparatus 1 or 1A of the first or second embodiment described above in terms of a function in that it has a software requesting packet transmission function, a depression function and an expansion function. It is to be noted that those functions are realized by software executed by calculation, data accessing and so forth by the CPU 2.

Figure 16:
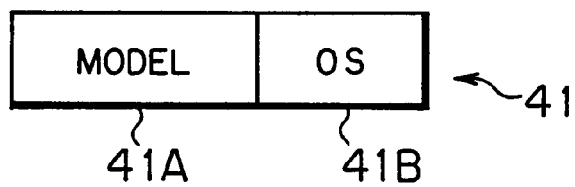
FIG. 16 is a diagrammatic view illustrating a packet to be transmitted from an information processing apparatus of the information processing system shown in FIG. 15.

The software requesting packet transmission function is a function of transmitting, when an operation mode for virus extermination is to be entered, for example, such a packet 41 as illustrated in FIG. 16 in order to request the virus exterminating software providing apparatus 19 for provision of necessary software. The depression function is a function of depressing a packet received through the computer network 18 into a program or data as software. The expansion function is a function of expanding depressed data into the RAM 3.

Thus, when the information processing apparatus 1B is to enter the operation mode for virus extermination, the CPU 2 clears information stored in all of those areas of the memories (RAM 3 and so forth) which are write-enabled in an ordinary operation, and transmits a packet 41 as a software requesting packet transmission function to the virus exterminating software providing apparatus 19.

The virus exterminating software providing apparatus 19 stores various kinds of virus extermination software (refer to reference symbols 12-1 to 12-8 shown in FIG. 5), which are stored in the storage apparatus 12 or 121 and 122 of the information processing apparatus 1 or 1A of the first or second embodiment described hereinabove.

Figure 17:
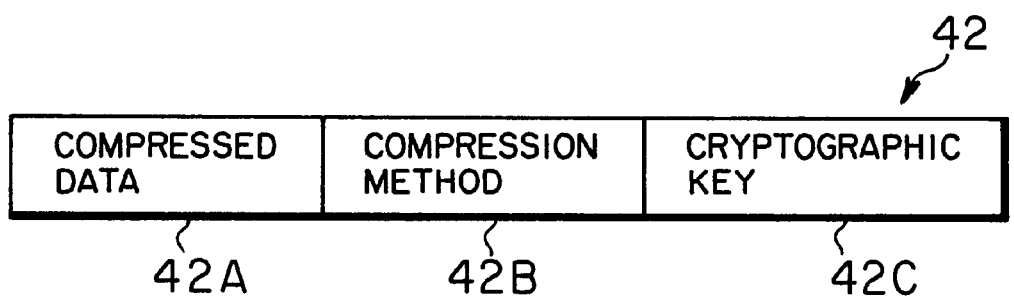
FIG. 17 is a diagrammatic view illustrating a packet to be transmitted from a virus exterminating software providing apparatus of the information processing system shown in FIG. 15.

Thus, when the packet 41 mentioned above is received from the information processing apparatus 1B, the virus extermination software described above can be transmitted, for example, in the form of such a packet as illustrated in FIG. 17 to the information processing apparatus 1B via the computer network 18.

Consequently, the information processing apparatus 1B can depress and execute the virus extermination software from the virus exterminating software providing apparatus 19 received in the form of a packet and enter the operation mode for virus extermination.

The packet 41 illustrated in FIG. 16 includes model information 41A of the information processing apparatus 1B and information 41B regarding an OS used. Meanwhile, the packet 41 illustrated in FIG. 17 includes compressed data information 42A of compressed software, information 42B regarding a compression method for the software, and a cryptographic key 42C for providing a security function.

It is to be noted that, in the information processing apparatus 1B in the third embodiment of the present invention, as trigger information for accepting provision of software from the virus exterminating software providing apparatus 19 described above, one of the processing modes in the first embodiment (starting depending upon a result of execution of a virus check program) and the second embodiment (starting prior to a stage of execution of the virus check program) can be used.

The information processing system 20 to which the virus extermination method according to the present invention is applied and which has the construction described above operates in the following manner.

For example, if it is detected as a result of execution of the virus check program that a virus is resident in the information processing apparatus 1B, then the processing mode for virus extermination can be started.

In this instance, the information processing apparatus 1B switches, in a similar manner as in the information processing apparatus 1 of the first embodiment described above, the gates 9-1 and 9-2 to put the ROM 4-1 into an access disabled state and put the ROM 4-2 into an access enabled state, and stops the resume function by clearing the RAM 3 using the BIOS stored in advance in the ROM 4-2, whereafter it transmits a packet 21 to request for provision of virus extermination software from the virus exterminating software providing apparatus 19.

When the packet 21 is received from the information processing apparatus 1B, the virus exterminating software providing apparatus 19 transmits the OS 12a in the form of a packet 42 illustrated in FIG. 17 to the information processing apparatus 1B.

The information processing apparatus 1B thus depresses the OS 12a received in the form of a packet from the virus exterminating software providing apparatus 19 and expands the OS 12a into the RAM 3. Consequently, the OS 12a can be started automatically. Thereafter, the information processing apparatus 1B can fetch necessary software suitably by communication of packets 41 and 42 similarly as in the case described hereinabove and perform a virus extermination operation similar to that in the first or second embodiment.

In this manner, with the information processing system 20 according to the third embodiment of the present invention, since an operating system in which no virus is resident can be fetched from the virus exterminating software providing apparatus 19 through the computer network 18 and started up to effect virus extermination, the advantages achieved by the apparatus of the embodiments described above can be achieved. Besides, the necessity for management of a large amount of software for virus extermination by the information processing apparatus 1B itself is eliminated, and consequently, a system of a LAN having a virus extermination function can be constructed efficiently.

e. Others

While, in each of the information processing apparatus 1, 1A and 1B of the embodiments described above, common addresses are set between the two ROMs 4-1 and 4-2 by the BIOS and only one of the ROMs 4-1 and 4-2 is allowed to be accessed by the CPU 2 by switching of the gates 9-1 and 9-2, setting of addresses is not limited to this, and if different addresses from each other are set to the ROMs 4-1 and 4-2 by the BIOS, then the CPU 2 can access any of the ROMs 4-1 and 4-2 without provision of the gates 9-1 and 9-2.

Figure 18:
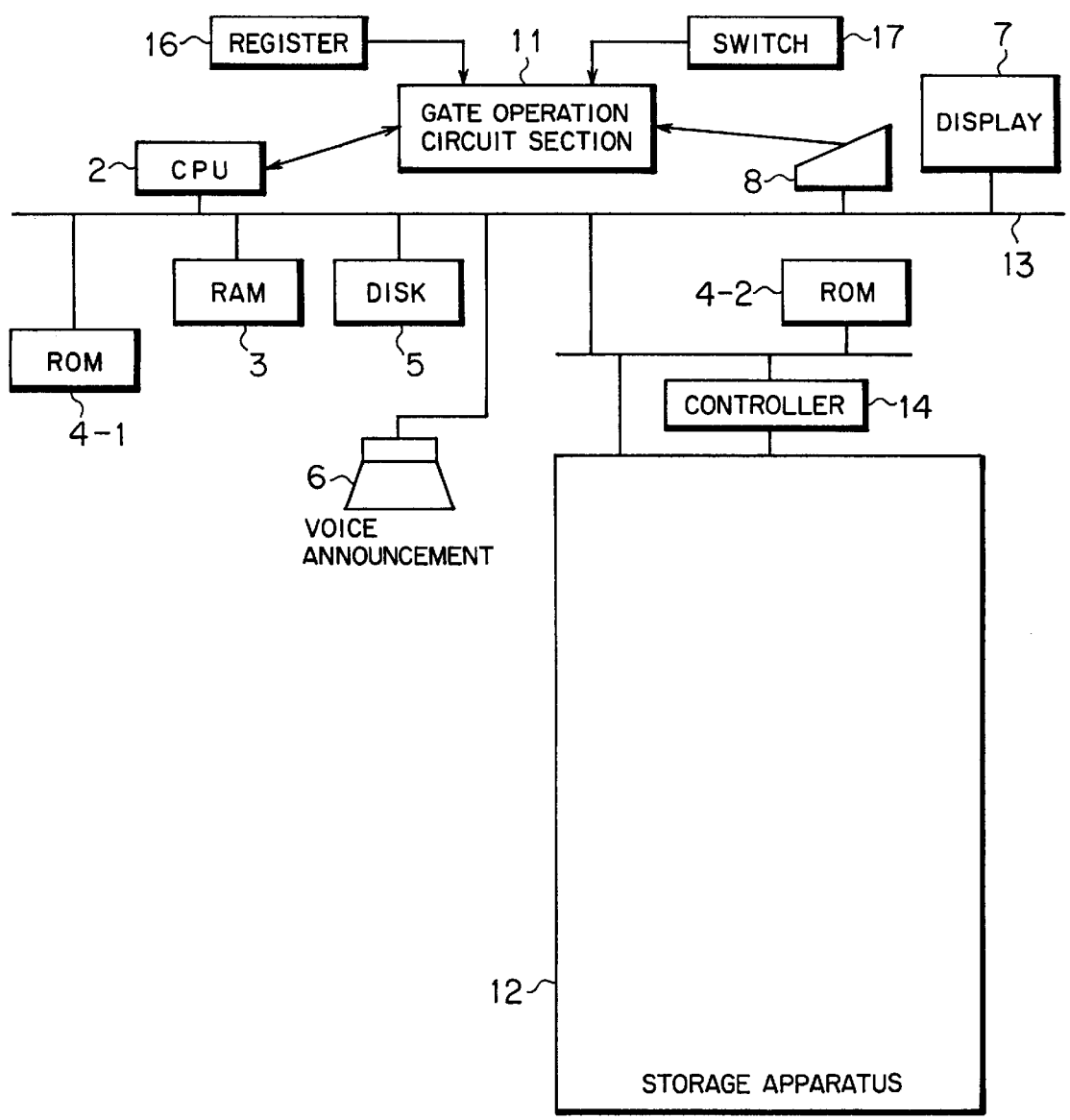
FIGS. 18 and 19 are block diagrams showing further information processing apparatus with a virus extermination function to which the present invention is applied.

For example, if different addresses from each other are set between the two ROMs 4-1 and 4-2 by the BIOS in the information processing apparatus 1 of the first embodiment of the present invention described above, then the CPU 2 can identify the ROMs 4-1 and 4-2 based on an address. Therefore, accessing to a medium infected with a virus can be prevented without provision of the gates 9-1 and 9-2 as seen from FIG. 18.

Figure 19:
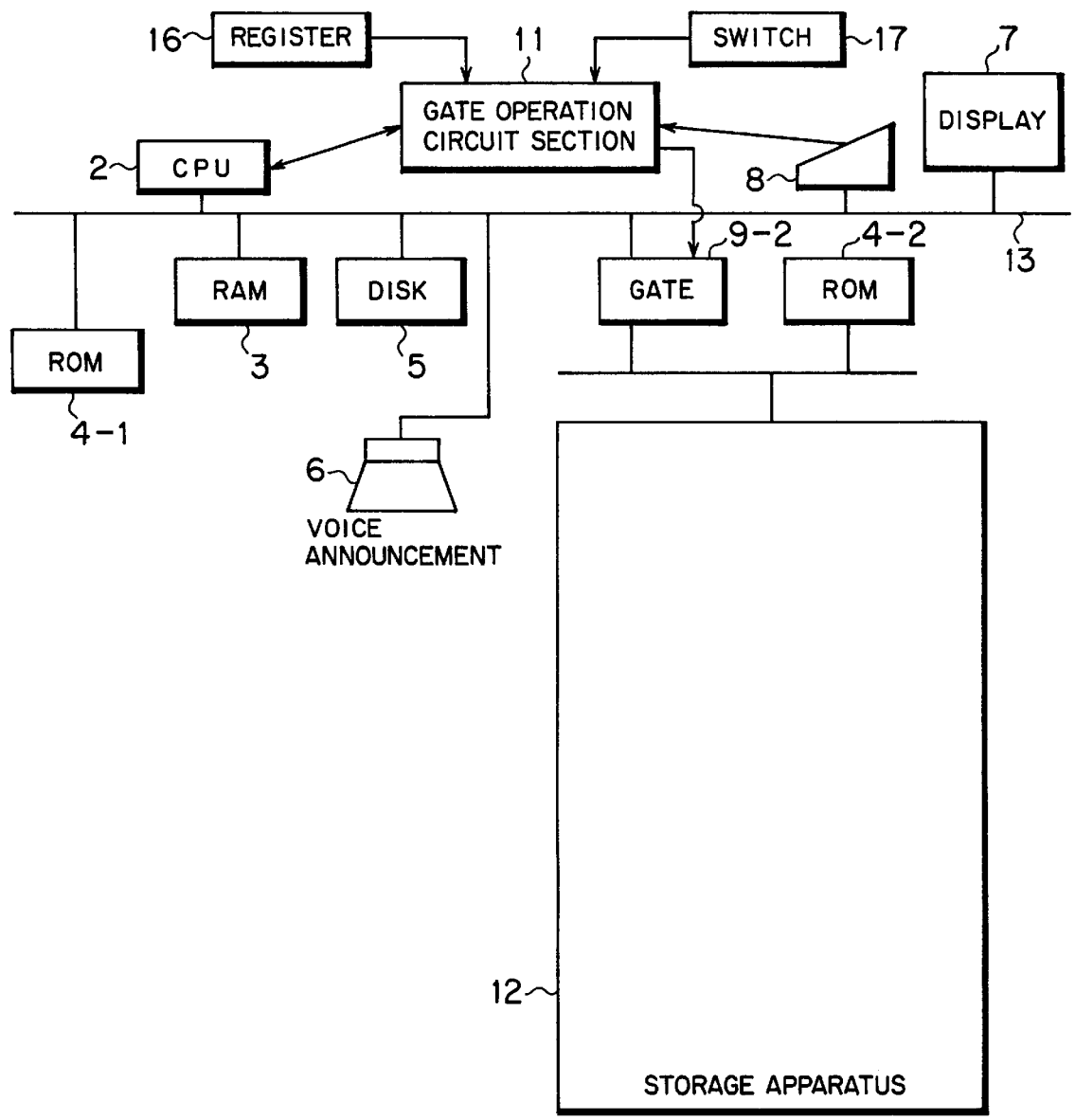

In this instance, inhibition of accessing to the ROM 4-2 can be made more certain by providing, as seen in FIG. 19, a gate 9-2 which effects switching between access enabled and disabled states to the ROM 4-2 such that, whereas different addresses from each other are set between the two ROMs 4-1 and 4-2 by the BIOS, the gate 9-2 is controlled, in an ordinary operation, to the disconnection state. Consequently, prevention of virus infection of the storage apparatus 12 or the ROM 4-2 as a destination of connection of the gate 9-2 can be made further certain.

The present invention is not limited to the specifically described embodiment, and variations and modifications may be made without departing from the scope of the present invention.

What is claimed is:

1. A method for exterminating a computer virus which infects a computer system and acts as a software destroying factor, the computer system having a processing section for executing an operating system program so as to process various data, a volatile memory section coupled with the processing section for temporarily storing the operating system program to be executed and the object data to be processed by the processing section, and a first non-volatile storage section connected to the processing section for storing various data including the operating system program, comprising;
   (i) detecting a computer virus which infects the computer system and identifying a type of the detected computer virus;
   if any computer virus is detected in said operation (i),
   (ii) outputting a trigger signal which indicates that the computer system starts the virus exterminating operation; and
   (iii) carrying out the virus exterminating operation in response to the trigger signal outputted in said operation (ii) by
      clearing the information stored in the volatile memory section,
      fetching an united operating system program from a second non-volatile storage section, which is separate from the first non-volatile storage section and connected to the processing section and to which storage section the processing section is prohibited to write data and placing the uninfected operating system, into the volatile memory section after the clearance of the information in the volatile memory section and starting up the computer system using the uninfected operating system program, and
      exterminating the detected computer virus under the uninfected operating system environment.

2. A virus extermination method as claimed in claim 1, wherein said exterminating of the computer virus in said operation iii is carried out by selectively using one of means for executing a virus extermination program, means for re-writing the operating system program in the first non-volatile storage section based on an input command, and means for formatting physical data in the first non-volatile storage section.

3. A virus extermination method as claimed in claim 2, wherein the virus extermination program used in said operation iii is fetched from selective one of an external storage connected to the computer system and a preset emergency storage area in the second non-volatile storage section.

4. A virus extermination method as claimed in claim 3, wherein a plurality of kinds of virus extermination programs are stored in the selective one of the external storage and the preset emergency storage area, and when the executing means is used in said operation iii, one of the plural kinds of virus extermination programs is selectively fetched according to the virus type identified in said operation i.

5. A virus extermination method as claimed in claim 2, wherein priorities of the three means selectively used in said operation iii are predetermined for each virus type which can be identified, and one of the three means is selected in said operation iii based on the predetermined priorities in accordance with the virus type identified in said operation i.

6. A virus extermination method as claimed in claim 2, wherein if any computer virus is detected but the type of the detected virus cannot be identified in said operation i, the formatting means is selected in said operation iii.

7. A virus extermination method as claimed in claim 2, wherein when the formatting means is selected in said operation iii, the information stored in the first non-volatile storage section is saved into an emergency storage area, which is previously set in the second non-volatile storage section, before formatting the physical data in the first non-volatile storage section.

8. A virus extermination method as claimed in claim 1, wherein the second non-volatile storage section is a dedicated external storage apparatus.

9. A virus extermination method as claimed in claim 1, wherein the second non-volatile storage section is a storage section of another information processing apparatus connected to the computer system via a computer network.

10. A virus extermination method as claimed in claim 1, further comprising the operation of exterminating the computer virus infecting any file stored in the first non-volatile storage section after said operation iii when the detected computer virus is identified as a file infection type in said operation i.

11. A virus extermination method as claimed in claim 1, wherein in said operation ii, the trigger signal is outputted in response to selective one of an input command from an input mechanism connected to the computer system and a result of execution of a software by the computer system.

12. A virus extermination method as claimed in claim 1, wherein a computer virus of a system infection type and/or a computer virus of a memory resident type is identified in said operation i.

13. A method for exterminating a computer virus which infects a computer system and acts as a software destroying factor, the computer system having a processing section for executing an operating system program so as to process various data, a volatile memory section coupled with the processing section for temporarily storing the operating system program to be executed and the object data to be processed by the processing section, and a first non-volatile storage section connected to be processing section for storing various data including the operating system program, comprising:
 (i) outputting a trigger signal which indicates that the computer system starts the virus detecting/exterminating operation; and
 (ii) carrying out the virus detecting/exterminating operation in response to the trigger signal outputted in said operation (i) by
  clearing the information stored in the volatile memory section,
  fetching an uninfected operating system program from a second non-volatile storage section, which is separate from the first non-volatile storage section and connected to the processing section and to which storage section the processing section is prohibited to write data, and placing the uninfected operating system into the volatile memory section after the clearance of the information in the volatile memory section and starting up the computer system using the uninfected operating system program,
  detecting a computer virus which infects the computer system and identifying a type of the detected computer virus under the uninfected operating system environment, and
  if any computer virus is detected, exterminating the detected computer virus under the uninfected operating system environment.

14. A virus extermination method as claimed in claim 13, wherein said exterminating of the computer virus in said operation ii is carried out by selectively using one of means for executing a virus extermination program, means for re-writing the operating system program in the first non-volatile storage section based on an input command, and means for formatting physical data in the first non-volatile storage section.

15. A virus extermination method as claimed in claim 14, wherein the virus extermination program used in said operation ii is fetched from selective one of an external storage connected to the computer system and a preset emergency storage area in the second non-volatile storage section.

16. A virus extermination method as claimed in claim 15, wherein a plurality of kinds of virus extermination programs are stored in the selective one of the external storage and the preset emergency storage area, and when the executing means is used in said operation ii, one of the plural kinds of virus extermination programs is selectively fetched according to the virus type identified in said operation ii.

17. A virus extermination method as claimed in claim 14, wherein priorities of the three means selectively used in said operation ii are predetermined for each virus type which can be identified, and one of the three means is selected in said operation ii based on the predetermined priorities in accordance with the virus type identified in said operation ii.

18. A virus extermination method as claimed in claim 14, wherein if any computer virus is detected but the type of the detected virus cannot be identified in said operation ii, the formatting means is selected in the said operation ii.

19. A virus extermination method as claimed in claim 14, wherein when the formatting means is selected in said operation ii, the information stored in the first non-volatile storage section is saved into an emergency storage area, which is previously set in the second non-volatile storage section, before formatting the physical data in the first non-volatile storage section.

20. A virus extermination method as claimed in claim 13, wherein the second non-volatile storage section is a dedicated external storage apparatus for exclusive use.

21. A virus extermination method as claimed in claim 13, wherein the second non-volatile storage section is a storage section of another information processing apparatus connected to the computer system via a computer network.

22. A virus extermination method as claimed in claim 13, further comprising the operation of exterminating the computer virus infecting any file stored in the first non-volatile storage section after said operation ii when the detected computer virus is identified as a file infection type in said operation ii.

23. A virus extermination method as claimed in claim 13, wherein in said operation i, the trigger signal is outputted in response to selective one of an input command from an input mechanism connected to the computer system and a result of execution of a software by the computer system.

24. A virus extermination method as claimed in claim 13, wherein a computer virus of a system infection type and/or a computer virus of a memory resident type is identified in said operation ii.

25. An information processing apparatus comprising:
 a processing section for executing an operating system program so as to process various data;
 a volatile memory section, coupled with said processing section, for temporarily storing the operating system program to be executed and the object data to be processed by said processing section;
 a first non-volatile storage section, connected to said processing section, for storing various data including the operating system program which is used by said processing section during a normal operation of said information processing apparatus:
  a second non-volatile storage section, separate from the first non-volatile storage section, connected to said processing section, to which storage section said processing section is prohibited to write data during all operations of the information processing apparatus other than copying an uninfected operating system program onto the second non-volatile storage section, for storing an operating system program which is not infected by any computer virus and is used by said processing section during a virus exterminating operation of said information processing apparatus;
  a virus detection/identification section for detecting a computer virus infecting said information processing apparatus and identifying a type of the detected computer virus;
  a virus-type registration section, responsive to the detection of any computer virus by said virus detection/identification section, for registering on said second non-volatile storage section the type of the computer virus identified by said virus detection/identification section;
  a trigger-signal output section for outputting a trigger signal indicating that said information processing apparatus starts the virus exterminating operation;
  a volatile-memory clear section, operatively connected to said volatile memory section, for clearing the information stored in said volatile memory section;
  an operating-system fetch and startup section for fetching the uninfected operating system program from said second non-volatile storage and placing the uninfected operating system section into said volatile memory section, after the clearance of the information stored in said volatile memory section, for execution by said processing section to thereby start up said computer system with using the uninfected operating system program; and
  a virus exertion section for exterminating the detected computer virus under the uninfected operating system environment, after the startup of said computer system with the uninfected operating system program, based on the registered type of the detected virus; and
  a virus extermination control section, responsive to the trigger signal from said trigger-signal output section, for carrying out the virus exterminating operation by controlling said volatile-memory clear section, said operating-system fetch and startup section and said virus exterminating section.

26. An information processing apparatus as claimed in claim 25, wherein said trigger-signal output section is operable to output the trigger signal when any computer virus which infects said information processing apparatus is detected by said virus detection/identification section.

27. An information processing apparatus as claimed in claim 25, wherein said trigger-signal output section is operable to output the trigger signal in response to selective one of a input command from an input mechanism connected to said information processing apparatus and a result of execution of software by said information processing apparatus.

28. An information processing apparatus as claimed in claim 25, wherein said virus detection/identification section is operable to identify a computer virus of a system infection type and/or a computer virus of a memory resident type.

29. A computer-readable recording medium for use in a computer system having a processing section for executing an operating system program so as to process various data, a volatile memory section, coupled with the processing section, for temporarily storing the operating system program to be executed and the object data to be processed by the processing section, a first non-volatile storage section connected to the processing section for storing various data including the operating system program which is used by the processing section during a normal operation of the computer system, and a second non-volatile storage section connected to the processing section, the second non-volatile storage section separate from the first nonvolatile storage, to which storage section the processing section is prohibited to write data during all operations of the computer system other than the operation of copying the virus free operating system onto the secondary storage unit, for storing an operating system program which is not infected by any computer virus and used by the processing section during a virus exterminating operation of the computer system, said medium storing a virus extermination program executable by the computer system to perform:
  during the normal operation of the computer system,
    (I) detecting a computer virus which infects the computer system and identifying a type of the detected computer virus; if any computer virus is detected and identified in said operation (I),
    (II) outputting a trigger signal which indicates that the computer system starts the virus exterminating operation; and
    (III) carrying out the virus exterminating operation in response to the trigger signal outputted in said operation (II) by
      clearing the information stored in the volatile memory section;
      fetching the uninfected operating system program from the second non-volatile storage section and placing the uninfected operating system into the volatile memory section after the clearance of the information in the volatile memory section and starting up the computer system using the uninfected operating system program, and
      exterminating the detected computer virus under the uninfected operating system environment.

30. A computer-readable recording medium for use in a computer system having a processing section for executing an operating system program so as to process various data, a volatile memory section, coupled with the processing section, for temporarily storing the operating system program to be executed and the object data to be processed by the processing section, a first-nonvolatile storage section connected to the processing section for storing various data including the operating system program which is used by the processing section during a normal operation of the computer system, and a second non-volatile storage section connected to the processing section, the second non-volatile storage section separate from the first nonvolatile storage, to which storage section the processing section is prohibited to write data during all operations of the computer system other than the operation of copying the virus free operating system onto the secondary storage unit, for storing an operating system program which is not infected by any computer virus and used by the processing section during a virus detecting/extermination operation of the computer system, said medium storing a virus extermination program executable by the computer system to perform:
  coping a virus free operating system into the second non-volatile storage unit; during operation of the computer system, (I) outputting a trigger signal which indicates that the computer system starts the virus detecting/exterminating operation; and (II) carrying out the virus detecting/exterminating operation in response to the trigger signal outputted in said operation (I) by clearing the information stored in the volatile memory section, fetching the uninfected operating system program from the second non-volatile storage section and placing the uninfected operating system program into the volatile memory section after the clearance of the information in the volatile memory section and starting up the computer system using the uninfected operating system program, detecting a computer virus infecting the computer system and identifying a type of the detected computer virus under the uninfected operating system environment, and if any computer virus is detected, exterminating the detected computer virus under the uninfected operating system environment.

31. A method for exterminating viruses on a computer containing a volatile memory section, comprising:

copying a virus free operating system into a secondary storage unit separate from a primary storage unit on the computer;

write protecting the secondary storage unit during all operations of the computer other than the operation of copying the virus free operating onto the secondary storage unit;

upon detecting a virus located on the computer, outputting a trigger signal which results in the following operations being performed on the computer:

clearing information stored in the volatile memory section;

copying the virus free operating system from the secondary storage unit into the volatile memory section; and exterminating the virus.

32. An apparatus comprising:

a computer connected to a nonvolatile primary storage unit and a volatile storage unit;

a nonvolatile secondary storage unit connected to the computer, the secondary storage unit separate from the primary storage unit, the secondary storage unit containing a virus free operating system and is write protected during all operations of the computer other than the operation of copying the virus free operating system onto the secondary storage unit; and a virus detection unit, connected to the computer, upon detecting a virus; clearing information stored in the volatile memory section, copying the virus free operating system from the secondary storage unit and placing the copy into the volatile memory section, and exterminating the virus.

* * * * *

UNITED STATES PATENT AND TRADEMARK OFFICE
CERTIFICATE OF CORRECTION

PATENT NO. : 6,240,530 B1  
DATED : May 29, 2001  
INVENTOR(S) : Yoshifusa Togawa Page 1 of 1

It is certified that error appears in the above-identified patent and that said Letters Patent is hereby corrected as shown below:

<u>Column 32,</u>  
Line 28, change "united" to -- uninfected --.

<u>Column 33,</u>  
Line 40, change "be" to -- the --.

Signed and Sealed this

Fourteenth Day of May, 2002

Attest:

JAMES E. ROGAN  
*Director of the United States Patent and Trademark Office*

*Attesting Officer*